United States Patent
Dolberg et al.

(10) Patent No.: US 12,079,721 B2
(45) Date of Patent: Sep. 3, 2024

(54) METHOD AND SYSTEM FOR RAILWAY OBSTACLE DETECTION BASED ON RAIL SEGMENTATION

(71) Applicant: RAIL VISION LTD, Ra'anana (IL)

(72) Inventors: Sagi Dolberg, Hod Hasharon (IL); Natalie Day, Kfar Yona (IL); Michael Levy, Modiin (IL); Avishay Alfandary, Tel-Aviv (IL); Avraham Ram Guissin, Beit Yanai (IL); Sharon Bason, Rosh Haayin (IL); Zohar Zeev Shechter, Rehovot (IL); Shahar Hania, Kedumim (IL); Yotam Azriel, Tel-Aviv (IL)

(73) Assignee: RAIL VISION LTD., Ra'anana (IL)

( * ) Notice: Subject to any disclaimer, the term of this patent is extended or adjusted under 35 U.S.C. 154(b) by 794 days.

(21) Appl. No.: 17/258,446

(22) PCT Filed: Jul. 10, 2019

(86) PCT No.: PCT/IL2019/050770
§ 371 (c)(1),
(2) Date: Jan. 7, 2021

(87) PCT Pub. No.: WO2020/012475
PCT Pub. Date: Jan. 16, 2020

(65) Prior Publication Data
US 2021/0279488 A1    Sep. 9, 2021

Related U.S. Application Data

(60) Provisional application No. 62/695,901, filed on Jul. 10, 2018.

(51) Int. Cl.
*G06N 3/08* (2023.01)
*B61L 23/04* (2006.01)
(Continued)

(52) U.S. Cl.
CPC .............. *G06N 3/08* (2013.01); *B61L 23/041* (2013.01); *G06F 18/214* (2023.01); *G06N 3/04* (2013.01);
(Continued)

(58) Field of Classification Search
CPC . G06N 3/08; G06N 3/04; G06N 3/045; B61L 23/041; G06F 18/214; G06T 7/11;
(Continued)

(56) References Cited

U.S. PATENT DOCUMENTS 6,163,755 A * 12/2000 Peer ...................... B61L 23/044
701/19
2004/0056182 A1 * 3/2004 Jamieson .............. B61L 23/041
250/221

(Continued)

FOREIGN PATENT DOCUMENTS

| CN | 107301400 | 10/2017 |
|---|---|---|
| DE | 10 2015 219690 A1 | 4/2017 |
| WO | WO 2018/073778 A1 | 4/2018 |

OTHER PUBLICATIONS

Selver et al., "Predictive Modeling for Monocular Vision Based Rail Track Extraction", 2017 10th International Congress on Image and Signal Processing, BioMedical Engineering and Informatics (CISP-BMEI 2017), pp. 1-6 (Year: 2017).*

(Continued)

*Primary Examiner* — Nay A Maung
*Assistant Examiner* — Jose M Torres
(74) *Attorney, Agent, or Firm* — PEARL COHEN ZEDEK LATZER BARATZ LLP

(57) ABSTRACT

Systems and methods for rails and obstacles detection based on forward-looking electrooptical imaging, novel system architecture and novel scene analysis and image processing are disclosed. The processing solution utilizes a deep learn- (Continued)

ing semantic scene segmentation approach based on a rails and switches states detection neural network that determines the railway path of the train in the forward-looking imagery, and an objects and obstacles detection and tracking neural network that analyzes the vicinity of the determined railway path and detects impending obstacles.

10 Claims, 29 Drawing Sheets

(51) Int. Cl.
| | | |
|---|---|---|
| *G06F 18/214* | (2023.01) | |
| *G06N 3/04* | (2023.01) | |
| *G06T 7/11* | (2017.01) | |
| *G06V 10/764* | (2022.01) | |
| *G06V 20/58* | (2022.01) | |

(52) U.S. Cl.
CPC ............. *G06T 7/11* (2017.01); *G06V 10/764* (2022.01); *G06V 20/58* (2022.01); *G06T 2207/10048* (2013.01); *G06T 2207/20081* (2013.01); *G06T 2207/20084* (2013.01)

(58) Field of Classification Search
CPC . G06T 2207/10048; G06T 2207/20081; G06T 2207/20084; G06V 10/764; G06V 20/58
See application file for complete search history.

(56) References Cited

U.S. PATENT DOCUMENTS

| | | | |
|---|---|---|---|
| 2006/0098843 A1* | 5/2006 | Chew | B61L 23/041 382/104 |
| 2015/0269722 A1* | 9/2015 | Naithani | G06V 20/588 382/104 |
| 2016/0152253 A1* | 6/2016 | Katz | B61L 15/0081 246/167 R |
| 2017/0369057 A1 | 12/2017 | Gurghian et al. | |
| 2019/0176862 A1* | 6/2019 | Kumar | B61L 15/0081 |

OTHER PUBLICATIONS

Athira S., "Image Processing based Real Time Obstacle Detection and Alert System for Trains", Proceedings of the Third International Conference on Electronics Communication and Aerospace Technology, ICECA Jun. 12-14, 2019, pp. 740-745 (Year: 2019).*
J. Corsino Espino, B. Stanciulescu and P. Forin, "Rail and turnout detection using gradient information and template matching," *2013 IEEE International Conference on Intelligent Rail Transportation Proceedings,* 2013, pp. 233-238.
European Search Report for Application No. EP19833550.7, mailed on Mar. 7, 2022.
Neven, Davy, et al. Towards end-to-end lane detection: an instance segmentation approach. In: 2018 IEEE Intelligent Vehicles Symposium (IV). IEEE, 2018. p. 286-291. Feb. 15, 2018.
International Search Report of Application No. PCT/IL2019/050770 mailed on Nov. 4, 2019.

* cited by examiner

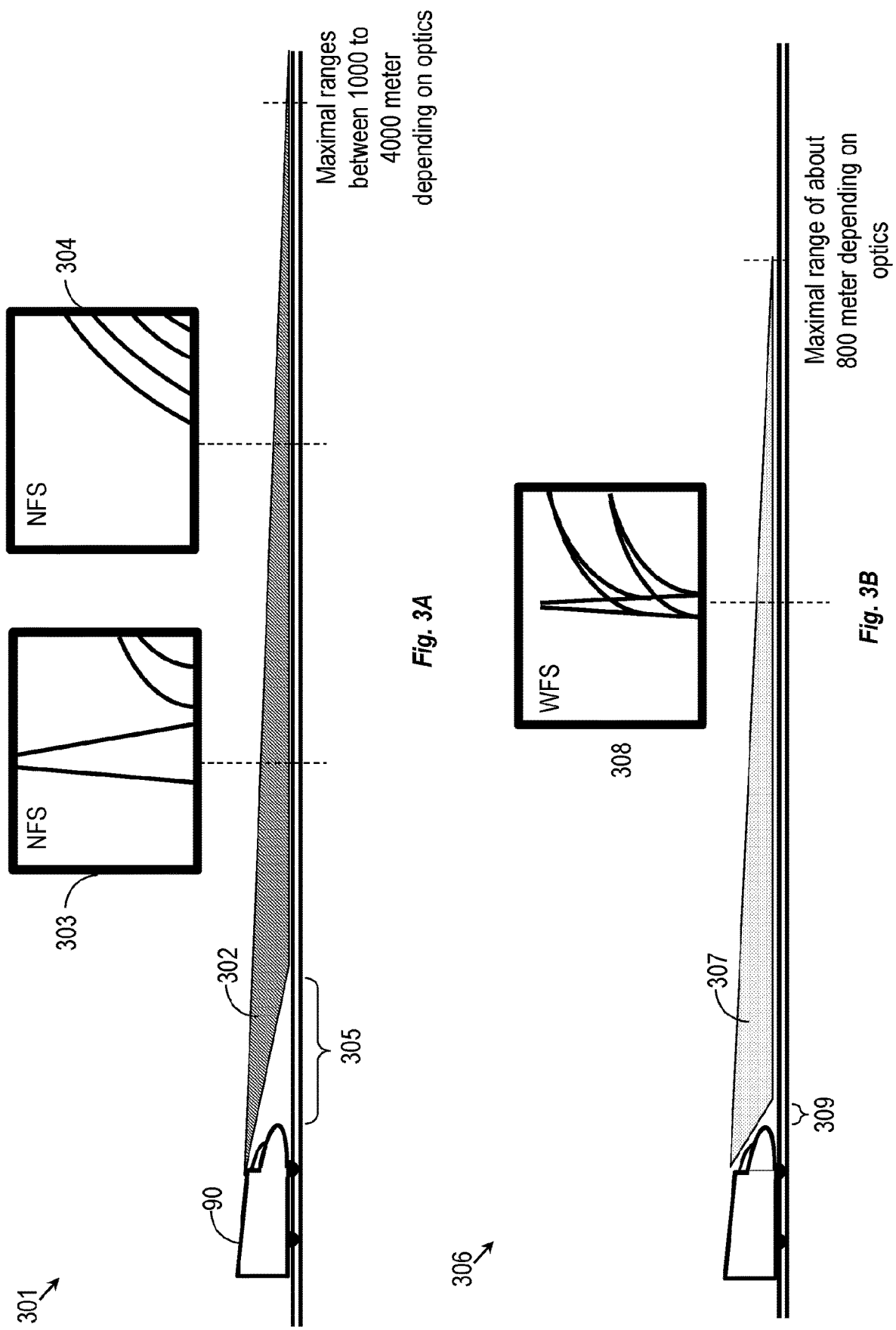

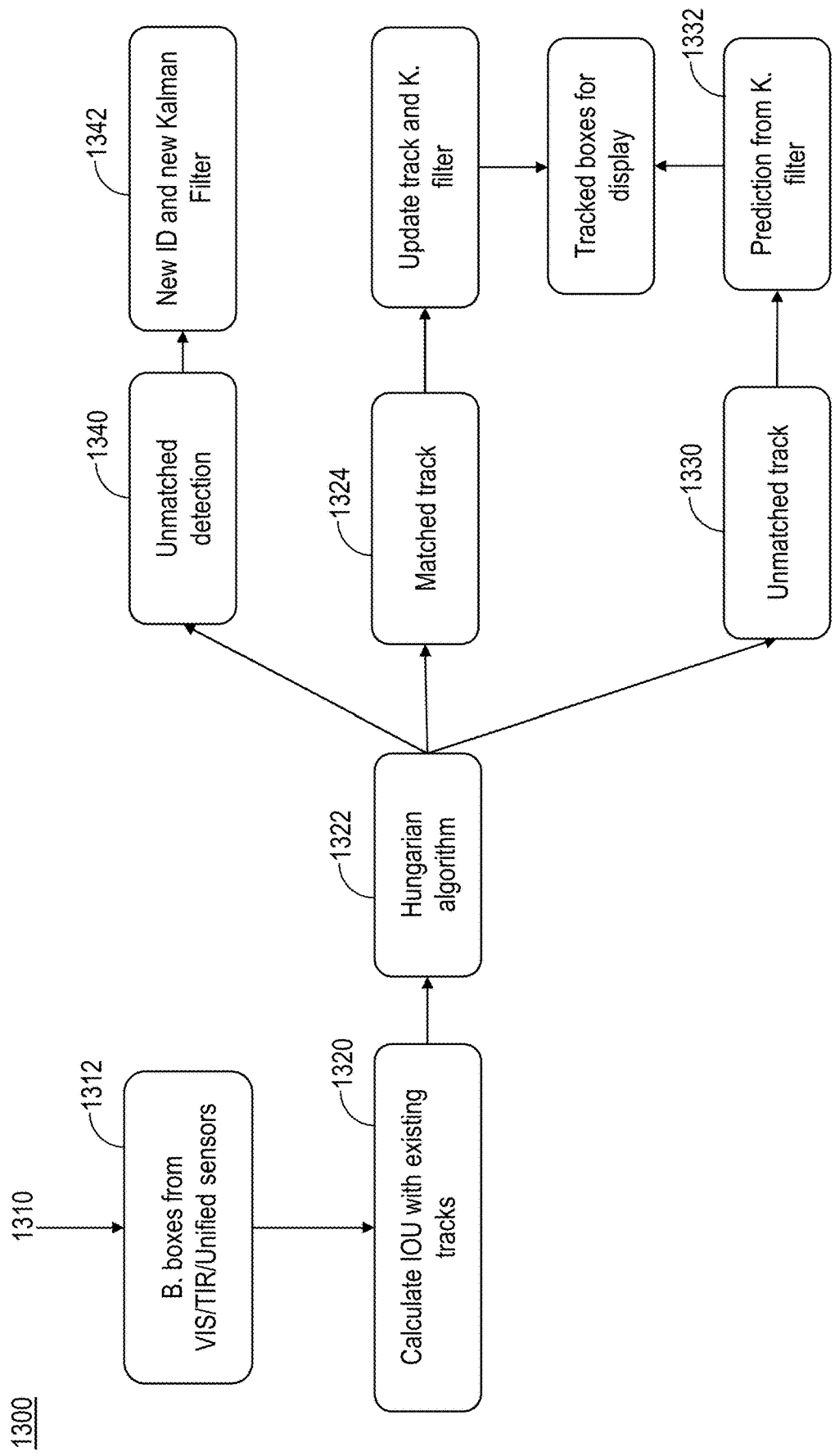
Fig. 13 (cont. 1)

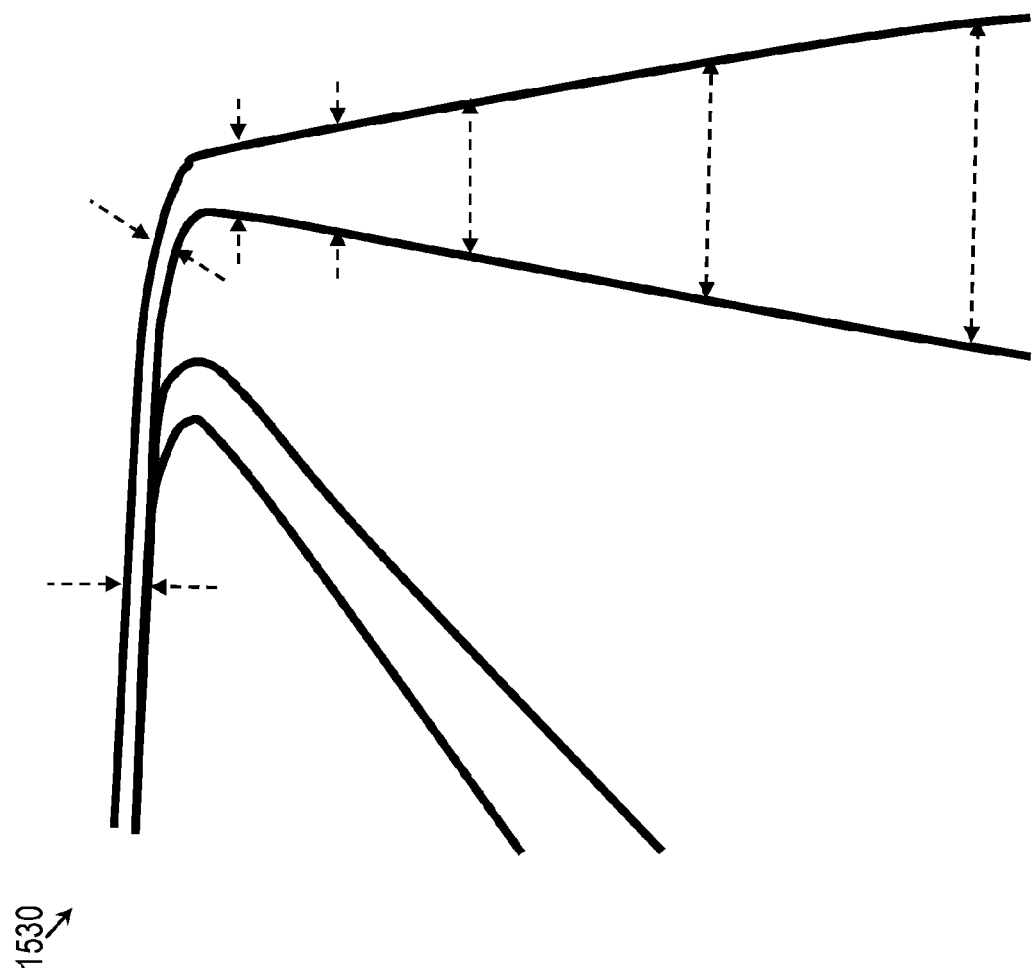
Fig. 15 (cont. 1)

METHOD AND SYSTEM FOR RAILWAY OBSTACLE DETECTION BASED ON RAIL SEGMENTATION

CROSS-REFERENCE TO RELATED APPLICATIONS

This application is a National Phase Application of PCT International Patent Application No. PCT/IL2019/050770, International Filing Date Jul. 10, 2019, entitled Method and System for Railway Obstacle Detection Based on Rail Segmentation, published on Jan. 16, 2020 as PCT International Patent Application Publication No. WO 2020/012475, claiming the benefit of U.S. Provisional Patent Application No. 62/695,901, filed Jul. 10, 2018, which is hereby incorporated by reference.

FIELD OF THE INVENTION

The present invention relates to the field of systems and methods for rail segmentation and obstacle detection for collision avoidance and situation awareness in railway applications, and more particularly, to computer aided imaging-based and cognitive processing-based techniques thereof.

BACKGROUND OF THE INVENTION

In typical electro-optic computer aided imaging techniques, real time imaging of a region or a scene is produced and processed in order to analyze it and extract desired data therefrom.

For example, in railway safety and collision avoidance applications, various electro-optical sensors are used to survey and monitor railway scene. For example, wayside sensors and/or train-mounted (e.g., locomotive) sensors may be used. Such train-mounted, forward-looking sensors are used to survey railway scenes in real time, thereby detecting both the rails and/or detecting/classifying potential obstacles on or in the vicinity of the detected rails. Such functions and related alerts and alarms may be used to assist driver operation of trains and to provide safety functions for train operation (e.g., for autonomous train operation).

Known train applications may, for example, include urban trains (e.g., trams), mainline trains, high speed trains, freight trains and switch yard operations using freight locomotives. A broad variety of potential on-track obstacles of interest may, for example, include humans, animals, vehicles, trains, wagons, man-made objects, natural debris (e.g., fallen tree trunks). In addition to on-track safety and security issues, there is a problem of suicidal actions that further require rapid response and analysis of impending suicide instances.

Electro-optical day and night image frame-based detection and classification of objects and obstacles in railway scenes may be challenging due to the extended ranges and diverse weather conditions required for such sensing and image frame/scene analysis and rapidly responding to such impending collisions (e.g., generating alarms, reducing the speed of the train, stopping the train in time).

SUMMARY OF THE INVENTION

One aspect of the present invention may provide a method of rails and obstacles detection. The method may include: receiving a plurality of image frames from at least one imaging sensor installed on a locomotive of a train, wherein the at least one imaging sensor facing a direction of travel of the train; determining, for each image frame of a subset of the plurality of image frames, an input data structure comprising the respective image frame and a history element, wherein the history element may include a segmentation mask prediction determined for an image frame preceding to the respective image frame; and determining, based on the input data structure of each of the image frames of the subset and using a rails and switches states detection neural network (RSSD NN), a segmentation mask prediction of the respective image frame, wherein the segmentation mask prediction may include at least a current railway path along which the train travels.

In some embodiments, the segmentation mask prediction may further include at least one turnout along the current railway path representing a state of corresponding at least one switch along the current railway path.

In some embodiments, the method may further include training the RSSD NN prior to inferring thereof, the training is based on a training subset of training image frames and may include a predetermined number of training cycles, wherein each of the training cycles may include: determining, for each training image frame of the training subset, a training input data structure comprising the respective training image frame and a training history element, wherein the training history element may include a training segmentation mask prediction determined for a training image frame preceding to the respective training image frame; determining, based on the training input data structure of each of the training image frames of the training subset and using the RSSD NN, a training segmentation mask prediction of the respective training image frame; comparing the training segmentation mask prediction determined for each of the training image frames of the training subset with at least one predetermined annotated mask of the training image frame; and updating the training segmentation mask prediction determined for each of the training image frame of the training subset based on the comparison thereof.

In some embodiments, the method may further include augmenting the training segmentation mask prediction determined during at least one training cycle of the predetermined number of cycles, wherein augmenting of the training segmentation mask prediction may include at least one of: zeroing the entire training segmentation mask prediction; zeroing a predetermined portion of the training segmentation mask prediction; and replacing the predetermined portion of the training segmentation mask prediction with a specified label that retains a shape and location of a current railway path and ignores a distinction between the current railway path and at least one turnout along the current railway path.

In some embodiments, the method may further include determining, in at least one image frame of the subset, based on the segmentation mask prediction determined for the respective frame and using an objects and obstacles detection and tracking neural network (OODT NN), at least one object/obstacle on or in vicinity of the current railway path.

Another aspect of the present invention may provide a system for rails and obstacles detection, the system may include: at least one imaging sensor installed one a locomotive of a train to face a direction of travel of the train, to obtain a plurality of image frames; a rails and switches states detection (RSSD) module that may include a RSSD neural network (RSSD NN), the RSSD module is configured to: determine, for each image frame of a subset of the plurality of image frames, an input data structure comprising the respective image frame and a history element, wherein the history element comprises a segmentation mask prediction determined for an image frame preceding to the respective image frame; and determine, based on the input data structure of each of the image frames of the subset and using the RSSD NN, a segmentation mask prediction of the respective image frame, wherein the segmentation mask prediction comprises at least a current railway path along which the train travels.

In some embodiments, wherein the segmentation mask prediction further comprises at least one turnout along the current railway path representing a state of corresponding at least one switch along the current railway path.

In some embodiments, the system may further include an objects and obstacles detection and tracking module that may include an OODT neural network (OODT), wherein the OODT module is configured to determine, in at least one image frame of the subset, based on the segmentation mask prediction determined for the respective frame and using the OODT NN, at least one object/obstacle on or in vicinity of the current railway path.

In some embodiments, the at least one sensor is at least one of: a visual band imaging sensor and a thermal infrared sensor.

In some embodiments, the at least one sensor is at least one of: a narrow field-of-view imaging sensor and a wide field-of-view imaging sensor.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

For a better understanding of embodiments of the invention and to show how the same can be carried into effect, reference will now be made, purely by way of example, to the accompanying drawings in which like numerals designate corresponding elements or sections throughout.

In the accompanying drawings:

FIG. 3A is a schematic illustration of a narrow field-of-view of a narrow field-of-view imaging sensor (NFS) mounted on a train for long range rail and object/obstacle detection, according to some embodiments of the invention;

FIG. 3B is a schematic illustration of a wide field-of-view of a wide field-of-view imaging sensor (WFS) mounted on a train for short range rail detection, according to some embodiments of the invention;

Figure 1A:
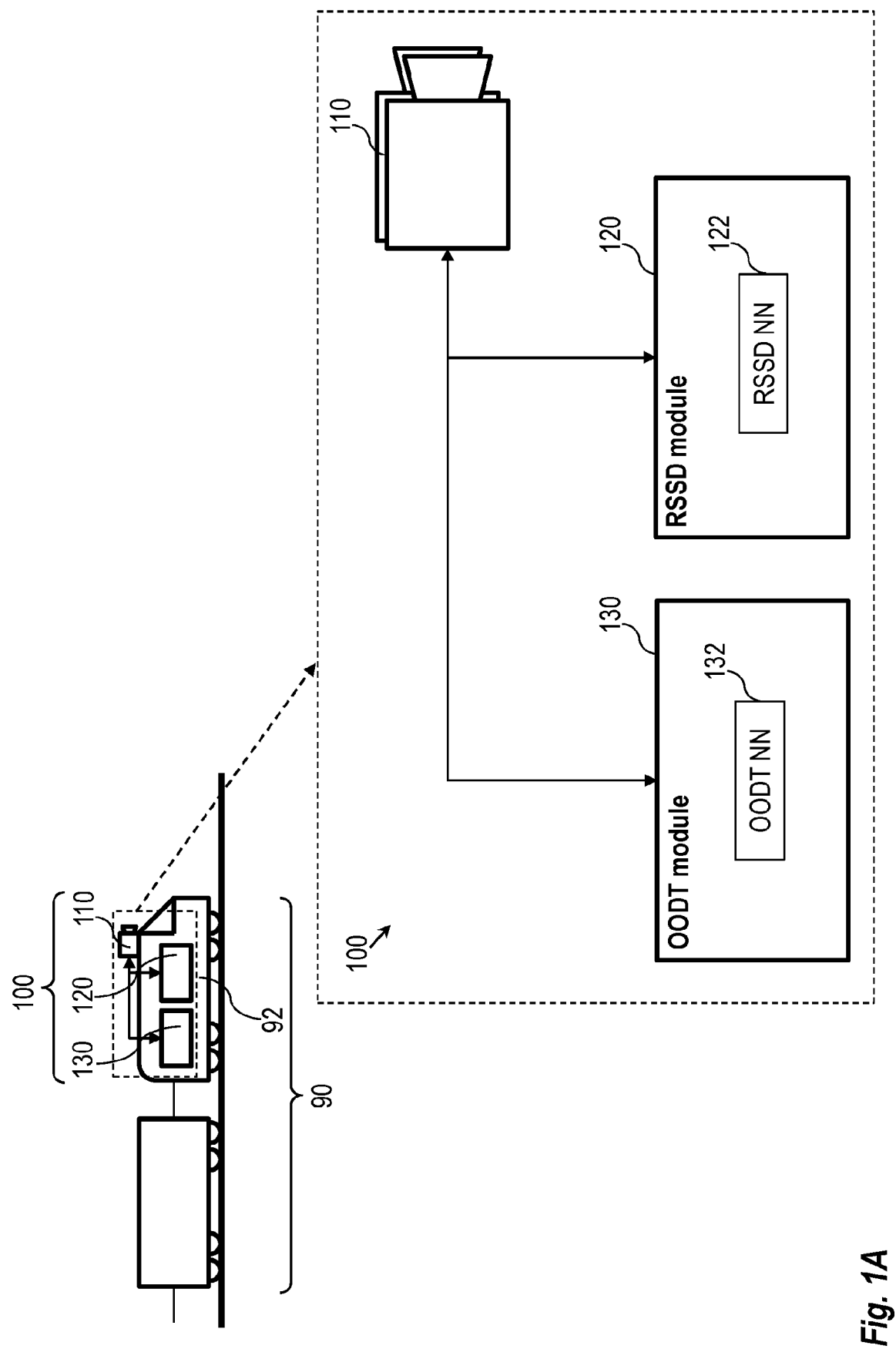
FIG. 1A is a schematic illustration of a system for rails and obstacles detection (ROD) mounted on a vehicle such as a train, according to some embodiments of the invention.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention are described. For purposes of explanation, specific configurations and details are set forth in order to provide a thorough understanding of the present invention. However, it will also be apparent to one skilled in the art that the present invention can be practiced without the specific details presented herein. Furthermore, well known features can have been omitted or simplified in order not to obscure the present invention. With specific reference to the drawings, it is stressed that the particulars shown are by way of example and for purposes of illustrative discussion of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention can be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that can be practiced or carried out in various ways as well as to combinations of the disclosed embodiments. Also, it is to be understood that the phraseology and terminology employed herein is for the purpose of description and should not be regarded as limiting.

Unless specifically stated otherwise, as apparent from the following discussions, it is appreciated that throughout the specification discussions utilizing terms such as "processing", "computing", "calculating", "determining", "enhancing" or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices. Any of the disclosed modules or units can be at least partially implemented by a computer processor.

In general, systems and methods for rails and obstacles detection based on forward-looking electrooptical imaging, novel system architecture and novel scene analysis and image processing are disclosed. The processing solution may utilize a deep learning semantic scene segmentation approach based on a rails and switches states detection neural network (RSSD NN) that may determine the railway path of the train in the forward-looking imagery, and an objects and obstacles detection and tracking neural network (OODT NN) that may analyze the vicinity of the determined railway path and detect impending obstacles. In various embodiments, alarms may be generated based on outputs from the RSSD NN and/or from the OODT NN.

In various embodiments, the RSSD NN and/or the OODT NN may approach detected and/or classified objects enabling various short-term and long-term machine learning processes providing fine tuning of the RSSD NN and/or the OODT NN. For example, as a short-term machine learning adaptation, an object classification at a standoff range may call for reducing the speed of a train, yet such decision may be reversed or modified shortly thereafter when the same object is reclassified as the train approaches such object. In another example, a long-term machine learning process may update the processing algorithm such that such erroneous decisions may be refined and tuned.

In various embodiments, the systems and methods may enable integration of all of the imaging and, optionally non-imaging, sensors in a situation awareness function that may provide a scene understanding ability to provide train drivers with man-in-the-loop decision support and/or driverless train operation fully automated decision. The disclosed systems and methods may also improve the ability of the train driver to visually perceive remote objects and potential obstacles in railway scenes and/or to accelerate the driver's perceptual process of detecting, classifying and responding to diverse operating conditions. Accordingly, the disclosed systems and methods may significantly reduce a workload of the train driver.

In some embodiments, the disclosed systems may generally include an imaging arrangement including one or more imaging sensors (e.g., visual band or thermal infrared sensors). The systems may include one or more image processing units for processing the images obtained by the imaging sensors. Such processing units may include computers, controllers, DSPs, GPUs and software modules designed for execution by the processing units, or dedicated hardware modules (e.g., IC, ASIC, FPGA). In some embodiments, the systems may include control and display units including user interfaces and display monitors (e.g., with or without touch screen interface).

Different objects of interest may pose varying challenges and decisions to a moving train. Stationary and moving humans, animals and vehicles may, for example, require different decisions and reactions in a moving train. Natural effects such as mud, water, puddles, snow, leaves and foliage, as well as weather and atmospheric conditions, may pose challenges to any sensing and analysis process and respective decision-making process. Rail malfunctions may, for example, include rail disconnects and missing rail segments. Wayside effects such as rail occlusions due to curving rails, and background scenes (e.g. bridges, masts etc.) in the vicinity of rails may generate false detections and classifications. Therefore, some embodiments of the present invention may utilize (e.g., separately or in parallel) different processing schemes for different objects of interest in order to account for such diversity of objects characteristics. For example, if a detected object has dimensions that are larger than predefined dimensions, the system/method may provide an alarm of "End-of-Rail (EOR)". This may be also relevant when there is a malfunctioning switch that is stuck in the middle of the way to right/left direction. In another example, when approaching to an end of a rail track with/without a buffer-stop the system/method may provide the BOR alert that may trigger an emergency braking.

In some embodiments, the disclosed systems and methods may enable adjusting the parameters thereof (e.g., such as probability of detection (PD), probability of classification (PC), false detection rate (FDR), false classification rate (FCR) and response time (RT) to thereby provide flexibility to the detection and classification in terms of addressing the different objects of interest and rail conditions, while complying with performance requirements.

Reference is now made to FIG. 1A, which is a schematic illustration of a system 100 for rails and obstacles detection (ROD) mounted on a train 90, according to some embodiments of the invention.

Figure 1B:
FIG. 1B is an example of an image frame obtained by imaging sensor(s) of a system for rails and obstacles detection and a segmentation mask prediction generated by a rails and switch state detection (RSSD) module thereof, according to some embodiments of the invention.

Reference is also made to FIG. 1B, which is an example of an image frame 110a obtained by imaging sensor(s) 110 of a system 100 for rails and obstacles detection and a segmentation mask prediction 120a generated by a rails and switch state detection (RSSD) module 120 thereof, according to some embodiments of the invention.

According to some embodiments, system 100 may include at least one imaging sensor 110, rails and switches states detection (RSSD) module 120, and objects and obstacles detection and tracking (OODT) module 130.

Figure 1B:
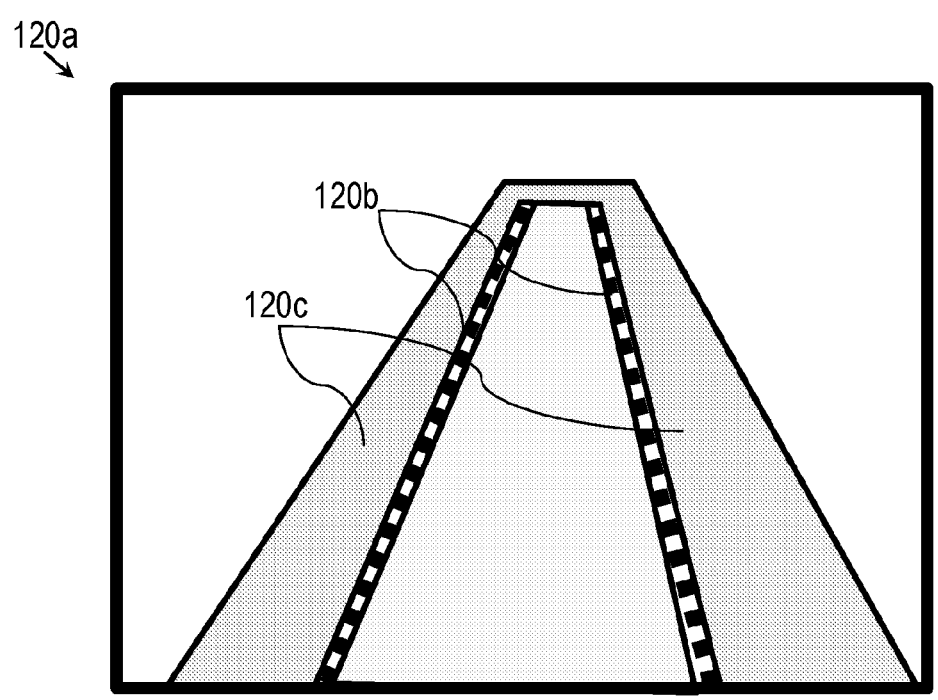

According to some embodiments, imaging sensor(s) 110 may be mounted on a locomotive 92 of a train 90 such that imaging sensor(s) 110 may face a direction of travel of train 90. Imaging sensor(s) 110 may be mounted at, for example, an elevated location for better forward-looking performance, as schematically depicted in FIG. 1.

Imaging sensor(s) 110 may acquire a plurality of image frames of a railway scene in-front of moving train 90. Image frame sensor(s) 110 may thereby provide a visualization of the railway scene to a driver of train 90 and/or to a third-party such as supervisor or a control room. Imaging sensor(s) 110 may be selected to operate in day and night, under all weather conditions and under extreme environmental conditions.

In various embodiments, imaging sensor(s) 110 may be wide field-of-view sensors (WFS) and/or narrow field-of-view sensors (NFS). In some embodiments, imaging sensor(s) 110 may be visible band sensor(s) (e.g., interchangeably referred herein after as "VIS sensor(s)"). For example, imaging sensor(s) 110 may be daylight video cameras such as CCD, CMOS, and/or ultra-low light CMOS, VIS, NIR, SWIR, MWIR, LWIR or any other imaging spectrum devices with extremely low readout noise and extremely high dynamic range, etc. In some embodiments, imaging sensor(s) 110 may be thermal infrared sensor(s) (e.g., interchangeably referred hereinafter as "TIR sensor(s)"). For example, imaging sensor(s) 110 may be cooled or uncooled thermal cameras such as long wave infrared cameras, etc.

According to some embodiments, RSSD module 120 may receive image frames from imaging sensor(s) 110. RSSD module 120 may be configured to perform a dynamic segmentation of the image frames to thereby determine at least one of rails, safety zones, switches, states of the switches and a current railway path along which train 90 travels or is about to travel, and to generate corresponding segmentation mask predictions of the image frames. The dynamic segmentation may be performed by, for example, utilizing deep learning means and methods such as using neural networks (e.g., convolution neural networks). For example, RSSD module 120 may include a RSSD neural network (RSSD NN) 122 configured to perform the dynamic segmentation of the image frames.

For example, FIG. 1B shows an example of an image frame 110a obtained by imaging sensor(s) 110 of system 100 and a segmentation mask prediction 120a thereof generated by RSSD module 120 of system 100. Segmentation mask prediction 120a shows, for example, rails 120b and safety zone 120c around rails 120b as detected/determined by RSSD module 120.

According to some embodiments, OODT module 130 may receive image frames from imaging sensor(s) 110. OODT module 130 may be configured to perform a dynamic segmentation of the image frames to thereby determine objects and/or obstacles on rails or in vicinity of the rails and/or to track a movement direction of the detected objects and/or obstacles. The segmentation may be performed by, for example, utilizing deep learning methods such as neural networks (e.g., convolution neural network). For example, OODT module 130 may include a OODT neural network (OODT NN) 132 configured to perform the dynamic segmentation of the image frames. The objects and/or obstacles may, for example, include vehicles, locomotives, trains, wagons, humans, animals, etc.

Various stationary and moving objects may appear in the imaging of forward-looking imaging sensor(s) 110 installed on moving or stationary train 90. Such objects may become potential obstacles when they are located on the train's tracks or in the vicinity of its tracks. Therefore, the ability to accurately and robustly designate and segment the image frame regions of the train's tracks is of high importance in achieving high performance of such a collision avoidance.

Railway tracks typically consist of a complex network of tracks with multiple crossings and switches (e.g., left-hand turnouts, right-hand turnouts, 3-way turnouts, single and double slips). While crossings are fixed and not varying, switches are the means of changing the path of the train depending on the discrete switch state. A functioning switch may only be in one discrete state at a given time (except for the short periods when the switch is transitioning between states). In determining the railway path of a train moving along a given track, it is therefore required to detect in the forward-looking imaging frame(s) the track on which the train is positioned, as well as determining the locations of impending switches and their respective switch states thereby anticipating locations in space and timelines to potential track changes.

In a forward-looking imaging there may be several respective impending switches to a given path, and the ability to determine in real time the currently preset path is important in forward-predicting any possible or impending collision with detected objects on or in the vicinity of the determined path. The states of switches along a predicted path may be changed electrically and remotely (e.g., from control centers) or manually, during determining the foreseen path (e.g., by RSSD module 120), The ability to optically detect at sufficiently long ranges the switches and their respective states, may be limited due to imaging sensor(s) 110 resolution, rail contrast, scattered debris or other obstructing effects (e.g., leaves, sand, snow) in the vicinity of the switches, line of sight limitations etc. Therefore, RSSD module 120 may be required to map the current track, detect the switches along the track, and for each such detected switch to determine its respective switch state. At some given point in time, the nearer switches may be detectable yet for some of these detected switches their respective switch states may not be determined until the train moves in closer. A dynamically changing mapping RSSD module 120 is therefore needed, that reflects such changing mapping over time as the train approaches the said switches down the said path.

A labeled dynamic mapping/segmentation of the track scene is therefore required to represent the following: pixel regions classified as background (e.g., labeled as '0'), pixel region classified as the current track (e.g., labeled as '1'), pixel region classified as switches (e.g., labeled as '2'), pixel regions classified as track turnouts that are not yet determined as the valid track beyond said switch as its switch state is not yet determined (e.g., labeled as '3'), and pixel regions classified as track turnouts beyond a given switch that are defined as the valid track based on a successful switch state determination (e.g., labeled as '4').

Various labeling configurations may be defined based on scene complexities and system operational logic. For example, a 3-label configuration may be defined with background, valid track, and turnout tracks that are not (or not yet) determined as the valid track. Such dynamic mapping/segmentation may be subsequently associated with object detection in determining obstacles and impending collisions.

According to some embodiments, a dynamic mapping/segmentation of forward-looking image frames of a railway scene, obtained using at least one of VIS imaging sensor, TIR imaging sensor, or both VIS imaging sensor and TIR imaging sensor, or any other combination of sensors (e.g., imaging sensor(s) 110), may be achieved by applying a deep learning neural network to the image frames thereof (e.g., by RSSD NN 122). The application of the neural network may include an offline training phase of the neural network, followed by online forward-inference of the neural-network.

In some embodiments, a novel input data structure to the RSSD NN 122 may be provided, wherein the input may include a unique feedback segmentation mask. The novel data structure input to RSSD NN 122 may include a two-layered image frame representation including a current image frame of the railway scene (e.g., the grey scale of the colored railway scene) as obtained by imaging sensor(s) 110 and a history element. The history element may, for example, be a segmentation mask prediction determined for an image frame preceding to the current image frame.

The process may follow a general line of neural network solutions for video segmentation, in which a sequence of consecutive video image frames is the input to the neural network, with a difference that the current method incorporates previously processed history element into the input data structure. Using the history element as part of the input data structure together with the current image frame time is a novel element according to some embodiments of the invention, wherein the solution uses only one extra data layer in addition to the original image frame. The history element of the input data structure encapsulates the information of the past image frames in a single representation, as opposed to current optical flow approaches that use short term motion computations or keeping several actual previous image frames as provided by the neural network approaches.

Another advantage of using the history element is in the relatively high frame rate compared to the train velocity, resulting in a high correlation between the current image frame and the mask history, hence facilitating a significantly improved segmentation performance of the current frame.

Another advantage of using history element is that the history element may feed switch state information into the network. This is especially important in cases where a new image frame is acquired while the locomotive (or train) is in, or in the vicinity of a switch. A system without any memory of the past switch state, will not be able to distinguish the correct train's path from the respective switch turnouts.

Once RSSD module 120 supplies the updated and real time train path (e.g., determined based on the segmented image frames determined by RSSD NN functionality 122), additional means of potential obstacle detection processing may by applied by OODT module 130 for avoiding collisions and accidents. In some embodiments, OODT NN functionality 132 may be applied to detect objects in the image frames, and its object detections may be spatially associated with the segmented pathfinder output in determining them as potential obstacles and providing respective alerts. Another preferred embodiment is that the OODT NN functionality 132 is augmented with additional post processing for non-maximum suspension (NMS) and tracking.

In some embodiments, the dynamic mapping/segmentation of forward-looking image frames of a railway scene may include multi-spectrally combining image frames obtained by, for example, VIS imaging sensor and TIR imaging sensor, or any other sensor (e.g., LIDAR) via pre-processing image frame fusion mapping, to yield a two-layer image frame prior to the history mask augmentation.

In some embodiments, the dynamic mapping/segmentation of the image frames may include multi-spectrally combining image frames obtained by VIS imaging sensor and TIR imaging sensor via pre-processing image frame fusion mapping, to yield a two-layer image frame input to OODT NN functionality 132, followed by object tacking.

In some embodiments, a single neural network functionality may combine RSSD NN 122 and OODT NN 132 by sharing the same feature deep layers while determining and defining different weighting functions for each of the segmentation and detection functions.

In some embodiments, the dynamic mapping/segmentation of the image frames may provide different functional flowcharts configurations for each of the VIS imaging sensor and the TIR imaging sensor.

Figure 2:
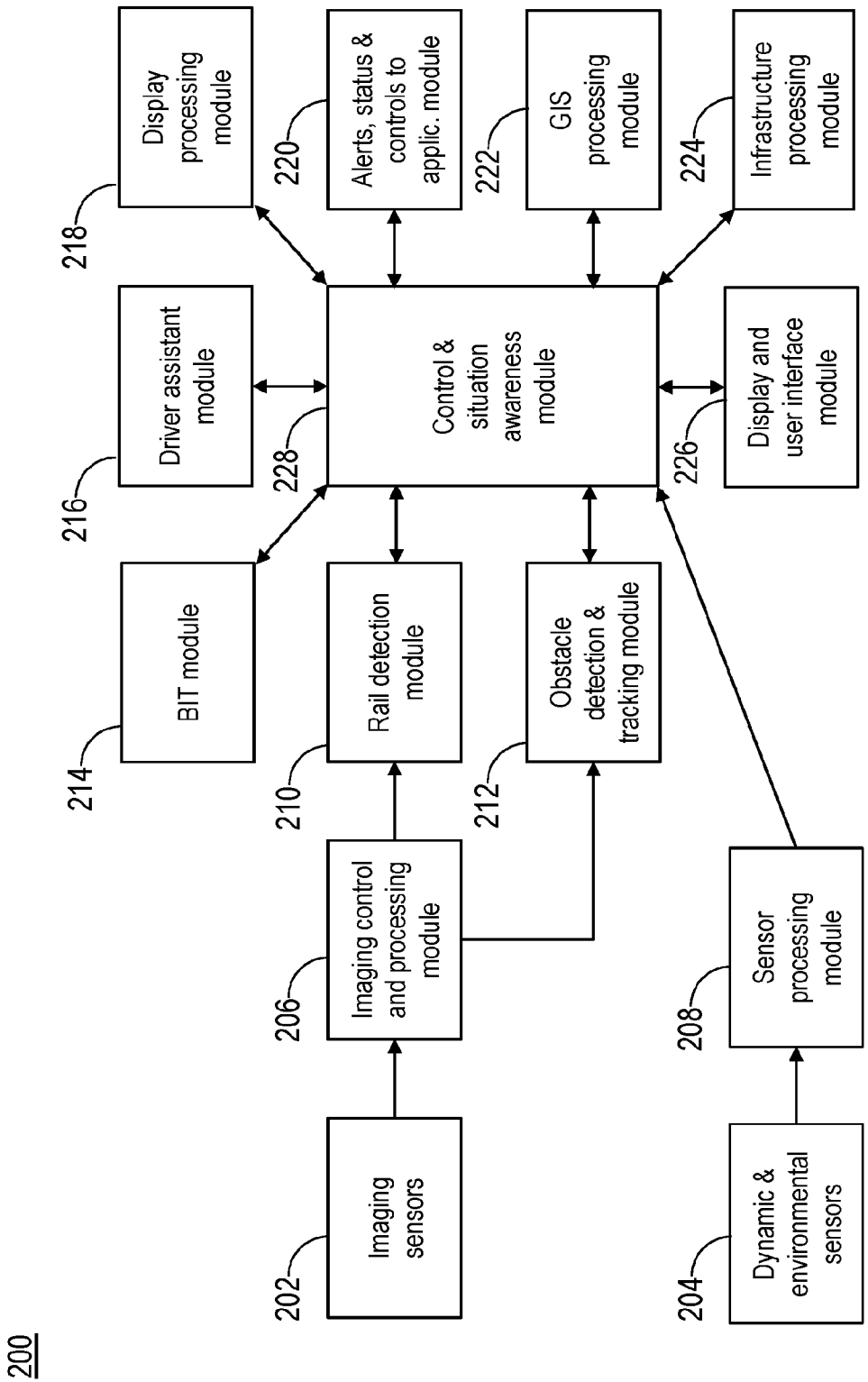
FIG. 2 is a schematic block diagram of a system for rails and obstacle detections (ROD), according to some embodiments of the invention.

Reference is now made to FIG. 2, which is a schematic block diagram of a system 200 for rails and obstacle detections (ROD), according to some embodiments of the invention.

According to some embodiments, system 200 may be used for rails and obstacles detection, e.g., by a moving or stationary train. For example, system 200 may be similar to system 100 described above with respect to FIG. 1A.

In some embodiments, system 200 may include at least one imaging sensor 202. Imaging sensor(s) 202 may be similar to imaging sensor(s) 110 described above with respect to FIG. 1A. Imaging sensor(s) 202 may, for example include high or low resolution and high sensitivity CMOS VIS band sensors, large format TIR band sensors (WFOV, NFOV), WFOV VIS coupling sensors (e.g., for switchyard applications), TIR band or light gated catenary sensors, etc.

In some embodiments, system 200 may include one or more additional sensors 204. Additional sensors 204 may, for example, include dynamic sensors such as GPS, INS, accelerometers and/or environmental sensors such as temperature, humidity and pressure sensors.

In some embodiments, system 200 may include an imaging control and processing module 206. Imaging control and processing module 206 may be configured to, for example, automatically control imaging sensor(s) 202, analyze and control a dynamic range of imaging sensor(s) 202, analyze and reduce noise of imaging sensor(s) 202, analyze and stabilize a line-of-sight of imaging sensor(s) 202, analyze and correct an image frame focus imaging sensor(s) 202, super resolution (e.g., mechanical mechanism for achieving an improved resolution), etc.

In some embodiments, system 200 may include a sensor processing module 208. Sensor processing module 208 may be configured to, for example, perform calibration and/or correct errors in readings of additional sensors 204.

In some embodiments, system 200 may include a rails and switch state detection (RSSD) module 210. RSSD module 210 may be similar to RSSD module 120 described above with respect to FIG. 1A. RSSD module 210 may receive image frames from imaging sensor(s) 202 perform a segmentation of the image frames to thereby determine at least one of rails, safety zones, switches and switches states in the image frames and/or determine a railway path along which train 90 rides or to ride, based on the segmentation thereof.

In some embodiments, system 200 may include an object and obstacle detection and tracking (OODT) module 212. OODT module 212 may be similar to OODT module 130 described above with respect to FIG. 1A. OODT module 212 may receive image frames from imaging sensor(s) 202 and perform a segmentation of the image frames to thereby determine objects and/or obstacles on rails or in vicinity of the rails and/or to track the objects and/or obstacles thereof.

In some embodiments, system 200 may include a built-in-test (BIT) module 214. BIT module 214 may be configured to verify a performance of at least some of modules of system 200, including imaging and sensing, illumination and thermal conditions, atmospherics and line-of-sight dynamics and obstructions. The BIT module 214 may rely on, for example, railway scene as image framed by imaging sensor(s) 202, that may include elongated reference structures (e.g., the rails) that provide a reference in both VIS and TIR spectral bands for built-in testing. BIT module 214 may also rely on, for example, rail-based atmospheric analysis, radiance (e.g., as function of a range), visibility (e.g., as function of a range), transmittance (e.g., as function of a range), fog (e.g., as function of a range), haze (e.g., as function of a range), rain/snow (e.g., as function of a range), turbulence (e.g., as function of a range), scatter (e.g., as function of a range), vibration blur (e.g., as function of a range), motion blur (e.g., as function of a range and/or angle), depth of field-focus (e.g., as function of a range).

In some embodiments, system 200 may include a driver assistance module 216. Driver assistance module 216 may be configured to detect and/or track signals, identify/track signs, associate signals/signs with safety zones, utilize and update GIS, perform obstacle analysis, define locomotive breaking strategy, perform locomotive safety speed analysis (e.g., GIS real time information such as current and oncoming railway curvature radii and other railway information that effect safe peed control).

In some embodiments, system 200 may include a display processing module 218. Display processing module 218 may be configured to fuse image frames from different imaging sensors 202 (e.g., WFS, NFS, VIS and/or TIR sensors), to automatically adjust brightness and/or contrast of the image frames, etc.

In some embodiments, system 200 may include module 220 adapted to handle alerts, status and controls to application.

In some embodiments, system 200 may include a GIS processing module 222. GIS processing module 222 may be configured to perform a cognitive processing with geographical information that assists the system in better responding to various situations. Such geographical information may be derived and/or compared and/or updated to or from a Geographical Location Module (GLM) (including e.g., GPS<INS, pre-known data base etc.), image frame based navigation (IBN) using land marks for more accurate positioning and data base and/or digital maps creation and or update, a geographical information module (GIM) and a 3D module (3DM), all of which provide important real time data for the rails detection and object detection solutions. The GLM may, for example, provide real time location and/or derived speed information which may be used for monitoring various train safety criteria. The GLM together with GIM information may, for example, provide real time 3D geographical information regarding the railway layout and 3D terrain data, wayside infrastructure equipment (e.g., signaling posts, electrical equipment, rail turnouts and switches), crossings etc. These may be fed into the 3DM to generate a camera view point of the 3D information, and may be further utilized for utilization in a geo based rail map (GBRM) that may be combined with the image frame based rail map (IBRM) to thereby provide a robust solution for a variety of typical train operational situations in achieving improved performance of system 200.

In some embodiments, system 200 may include an infrastructure processing module 224.

In some embodiments, system 200 may include a display and user interface module 226. Display and user interface module 226 may be include one or more displays to display information to, for example, the driver of train and/or one or more user interfaces (e.g., keyboards, touch screens, etc.) to receive driver's input into the system.

In some embodiments, system 200 may include a control and awareness module 228. Control and awareness module 228 may be configured to provide decision support, alert management and BIT support, such that system 200 is continually capable to monitor operational situations based on the railway scene image framed by imaging sensor(s) and additional information such as signaling, signs etc.

Reference is now made to FIG. 3A, which is a schematic illustration of a narrow field-of-view 301 of a narrow field-of-view imaging sensor (NFS) mounted on a train 90 for long range rail and object/obstacle detection, according to some embodiments of the invention.

Reference is also made to FIG. 3B, which is a schematic illustration of a wide field-of-view 306 of a wide field-of-view imaging sensor (WFS) mounted on a train 90 for short range rail detection, according to some embodiments of the invention.

A system for rails and obstacles detection (ROD), such as system 100 described above with respect to FIG. 1A, may require an obstacle detection and alarm at sufficiently long ranges thereby allowing a fast moving train to come to a stop or at least to reduce speed thus allowing additional response means for avoiding the obstacle or at least minimizing damage and allowing a driver (in driver operated trains) to respond accordingly. In imaging sensor applications, this typically calls for increased resolution optics provided by, for example, narrow field-of-view imaging sensor (NFS). While providing sufficient resolution for object and obstacle detection and classification, the NFS may also pose a limitation in a curved rail situation if it is fixed with the train's frontal axis, wherein the rail section at extended ranges may fall outside the narrow field of the NFS. Moreover, railways often comprise multiple adjoining and crossing rails such that the NFS may be confused as to the respective rail of the moving train thereby limiting its ability to designate specific obstacles that relate to its rail (e.g., an oncoming train on an adjoining rail that does not pose an impending collision). An additional imaging sensor such as a wide field-of-view imaging sensor (WFS) with sufficient range overlap between the NFS and the WFS, may well assist in such situations wherein the WFS facilitates detects the respective rails and rail map at a shorter range thereby enabling the tracing of such rails to a distance in the WFS image frame thereby facilitating a smooth handover to the NFS image frame designating where and which are the respective rails of the train, such that the object/obstacle detection and designation may be correctly performed.

Illustration 301 in FIG. 3A shows a narrow field-of-view 302 of a narrow filed-of view imaging sensor (NFS) mounted on train 90 for long range rail and object/obstacle detection. Illustrations 303 and 304 illustrate two exemplary NFS imaging situations exhibiting ambiguity as to which rail is to be respectively associated. The ambiguity typically arises due to the fact that in order for the NFS to image frame extended ranges its line-of-sight (LOS) must be sufficiently raised, resulting in extended dead zone 305 (e.g., that may range between about 100-200 meters). Within such dead zones there may occur rail curvatures and turnouts, resulting in ambiguous selection of the correct rails.

Such ambiguities and extended dead zones may be resolved by mounting a wide field-of-view imaging sensor (WFS) on train 90. For example, illustration 306 in FIG. 3B shows a wide field-of-view 307 of the WFS having a dead zone 309 that is substantially smaller (e.g., of about few meters) than dead zone 305 of the NFS sensor. Illustration 308 shows the WFS image frame where image frame analysis can detect such developing curvatures and turnouts, thereby enabling correct tracing of the rails in the WFS and associating them with the rails detected in the NFS.

Figure 3C:
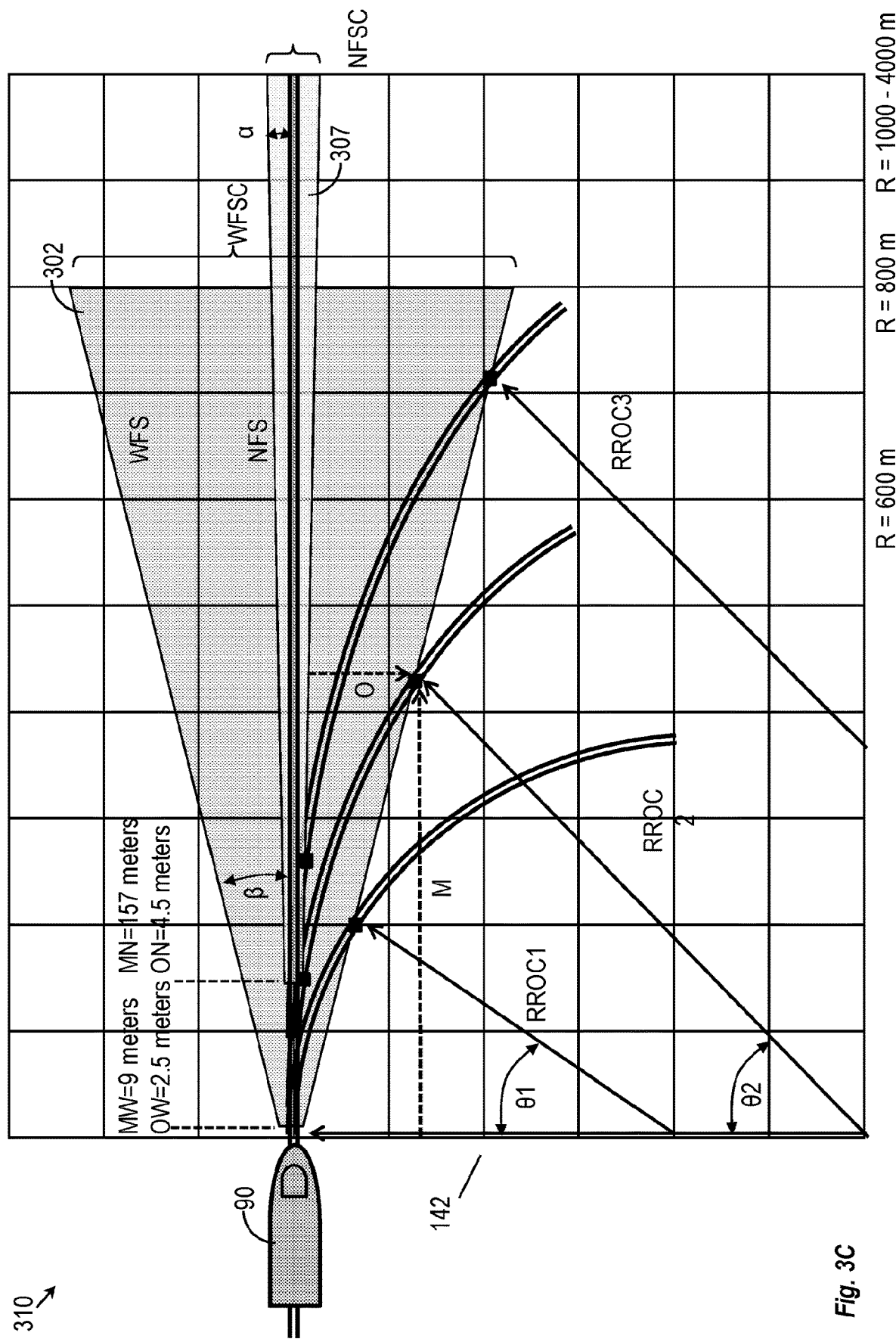
FIG. 3C shows an example of a top view of combined narrow field-of-view and wide field-of-view of narrow field-of-view imaging sensor (NFS) and wide field-of-view sensor (WFS) mounted on train, according to some embodiments of the invention.

Reference is now made to FIGS. 3C, which shows an example of a top view 310 of combined narrow field-of-view and wide field-of-view of narrow field-of-view imaging sensor (NFS) and of wide field-of-view sensor (WFS) mounted on train 90, according to some embodiments of the invention.

Figure 3D:
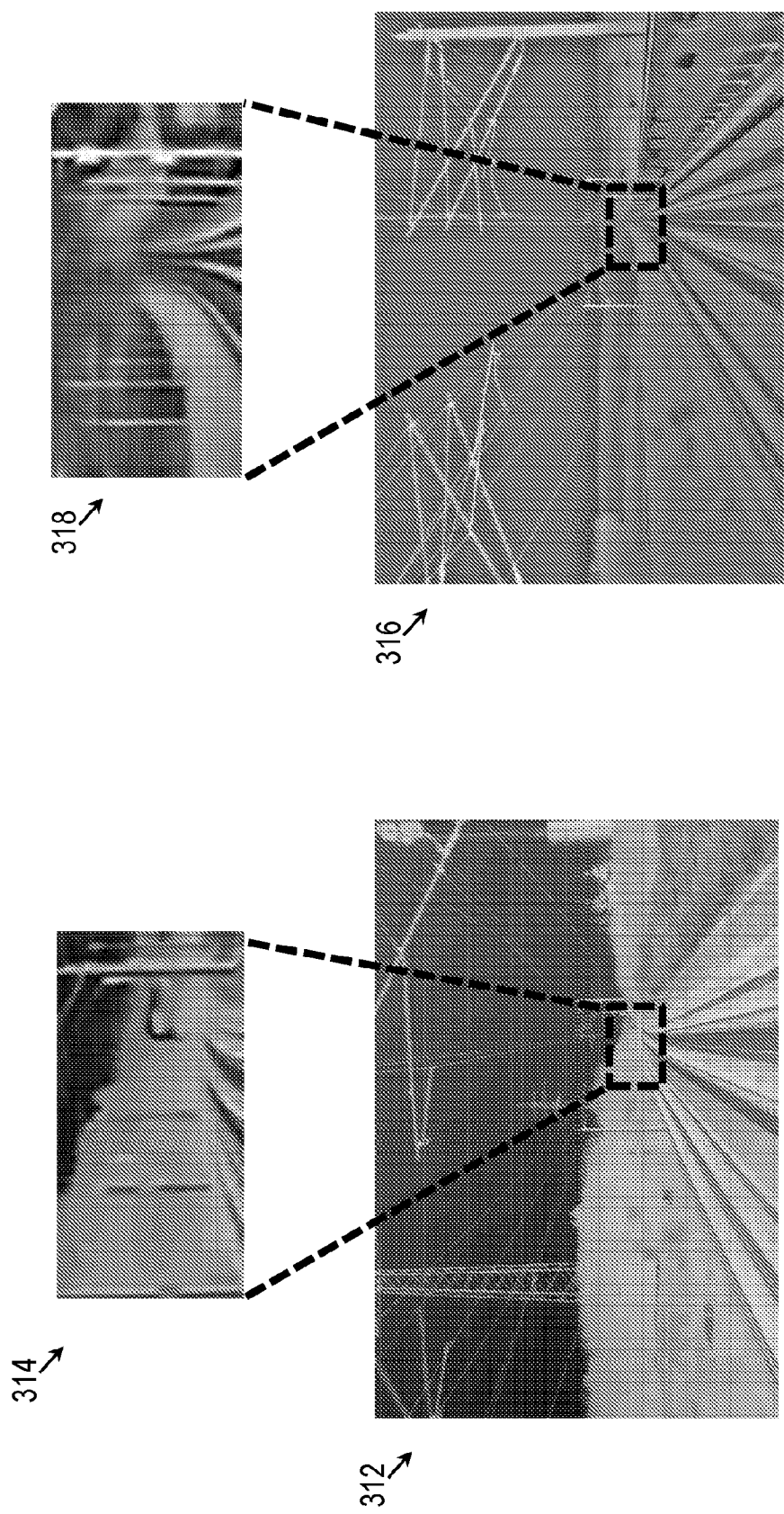
FIG. 3D shows two respective wide and narrow field of view scenes that depict the utility of combining a WFS short range coverage with a NFS long range coverage for improved object/obstacle detection and collision avoidance, according to some embodiments of the invention.

Illustrations 310 and 312 in FIGS. 3C and 3D, respectively, show a combined coverage of narrow field-of-view 302 and wide field-of-view 307 of narrow field-of-view imaging sensor (NFS) and wide field-of-view sensor (WFS), respectively, that facilitate improved rail coverage in varying rail radius of curvature (RROC) occurrences. This particular example is not limiting, and various system implementations may incorporate different values for ranges, arc angles and fields of view (FOV). In this demonstrative example, the WFS FOV (WFOV) is given by $2\beta$, and the NFS FOV (NFOV) is given by $2\alpha$. The angular arc $\theta$ that starts from the vertical axis 142 and crosses the WFOV and NFOV angular boundary at a respective RROC is given by $\theta W=2\beta$, and $\theta N=2\alpha$, respectively. The points of arc crossings represent a range M and offset O from the horizontal axis; $MW=RROC \sin 2\beta$ and $OW=RROC(1-\cos 2\beta)$, $MN=RROC \sin 2\alpha$ and $ON=RROC(1-\cos 2\alpha)$. The WFS Coverage (WFSC) is given by $WFSC=2R \sin\beta$, and the NFS Coverage (NFSC) is given by $NFSC=2R \sin\alpha$.

Example parametric settings may be defined for a particular operating point. For example, for a LWIR NFS pixel size of 17 µm and/or 14 µm, 12 µm or less, an NFS focal length of 190 mm may result in an instantaneous field of view (IFOV) of 0.09 mr; at 1000 meters this results in a pixel footprint of ~9 cm, that is ~2 pixels per human head diameter. The resulting NFOV=3.3°, and the coverage at 1000 meters NFSC=58 meters.

In another example, for a LWIR WFS pixel size of 17 µm and/or 14 µm, 12 µm or less, a WFS focal length of 19 mm results in an instantaneous field of view (IFOV) of 0.9 mr; at 500 meters may result in a pixel footprint of ~45 cm, that is ~3 pixels rail gauge at such 500 meters range. The resulting WFOV=33°, and the coverage at 500 meters WFSC=592 meters.

As described above, with the selected vertical elevation angles that may result in NFS maximal image framed range of 1000 meters and WFS maximal image framed range of 800 meters, the resulting NFS dead zone may be about 157 meters and at that range NFSC is about 9 meters, and the WFS dead zone is about 9 meters and at that range WFSC is about 5 meters. Note that such elevation angles there is considerable range overlap between the NFS and the WFS.

RROCs may be closely related to allowable train velocities, as presented in Table 1 below:

TABLE 1

| RROC vs. allowable train velocity. | | | | | | |
|---|---|---|---|---|---|---|
| Rail radius (RROC)/ Allowable train velocity | ≤33 m/s = 120 km/h | ≤56 m/s = 200 km/h | ≤69 m/s = 250 km/h | ≤83 m/s = 300 km/h | ≤97 m/s = 350 km/h | ≤111 m/s = 400 km/h |
| Cant 160 mm, cant deficiency 100 mm, no tilting trains | 630 m | 1800 m | 2800 m | 4000 m | 5400 m | 7000 m |
| Cant 160 mm, cant deficiency 200 mm, with tilting trains | 450 m | 1030 m | 2000 m | no tilting trains planned for these speeds | | |

The points of arc crossings representing a range M and offset O from the horizontal axis may be related to RROCs, as presented in Table 2 below:

TABLE 2

| Range M and offset O values vs. RROCs for WFS and NFS sensors. | | | | | |
|---|---|---|---|---|---|
| Sensor | RROC (meters) | 500 | 1000 | 2000 | 6000 |
| WFS | M (meters) | 272 | 543 | 1086 | 3258 |
|  | O (meters) | 80 | 160 | 320 | 960 |
| NFS | M (meters) | 29 | 58 | 116 | 348 |
|  | O (meters) | 0.8 | 1.6 | 3.2 | 9.6 |

It may be noted from the above description that for a LWIR NFS allowing sufficient resolution at long range, the resulting NFOV is very small and insufficient in the face of rail curves. For example, for trains operating at 200-250 km/h, a minimal RROC of about 2000 meters is allowed, and for the above NFS this results in relatively short ranges of about 116 meters before departing from the angular coverage. Some embodiments for overcoming this limitation may include to allow a NFS panning action. The WFS may determine the general angular location of the respective rail, and the NFS may be angularly directed there via, for example, an external panning mirror or a mechanical rotation of the entire NFS.

The combined use of WFS and NFS image framers may be generally called for as required detection ranges increase for high speed trains, depending on specified stopping distances. As train speeds decrease, for example in the case of city trams and slow urban trains, a WFS may be sufficient as detection ranges and stopping distances are significantly reduced. Therefore, the combined use of WFS and NFS image framers may be modular in various embodiments of the invention, wherein the WFS and NFS imaging sensors configurations may be designed as add-ons such that a generic RODS may be designed, allowing for modular extensions thereby supporting a variety of slow and fast moving trains.

Reference is now made to FIG. 3D, which shows two respective wide and narrow field of view scenes that depict the utility of combining a WFS short range coverage with a NFS long range coverage for improved object/obstacle detection and collision avoidance, according to some embodiments of the invention.

Image frame 312 depicts a WFS curving rail example, and frame 314 is the NFS scene as outlined by the broken line rectangle. Due to the image frame structures adjoining and between the rails, it is very difficult to select the correct rails when using only the NFS. Moreover, in the NFS an oncoming (or stationary) train is observed but it is unclear whether it uses the adjoining rails in which case it is safe or is using the same rail of the train which is an impending collision. Frame 316 is another WFS scene with straight rails however the rail region is cluttered imposing a difficulty in determining the correct rails for the train, as depicted by frame 318.

Figure 4A:
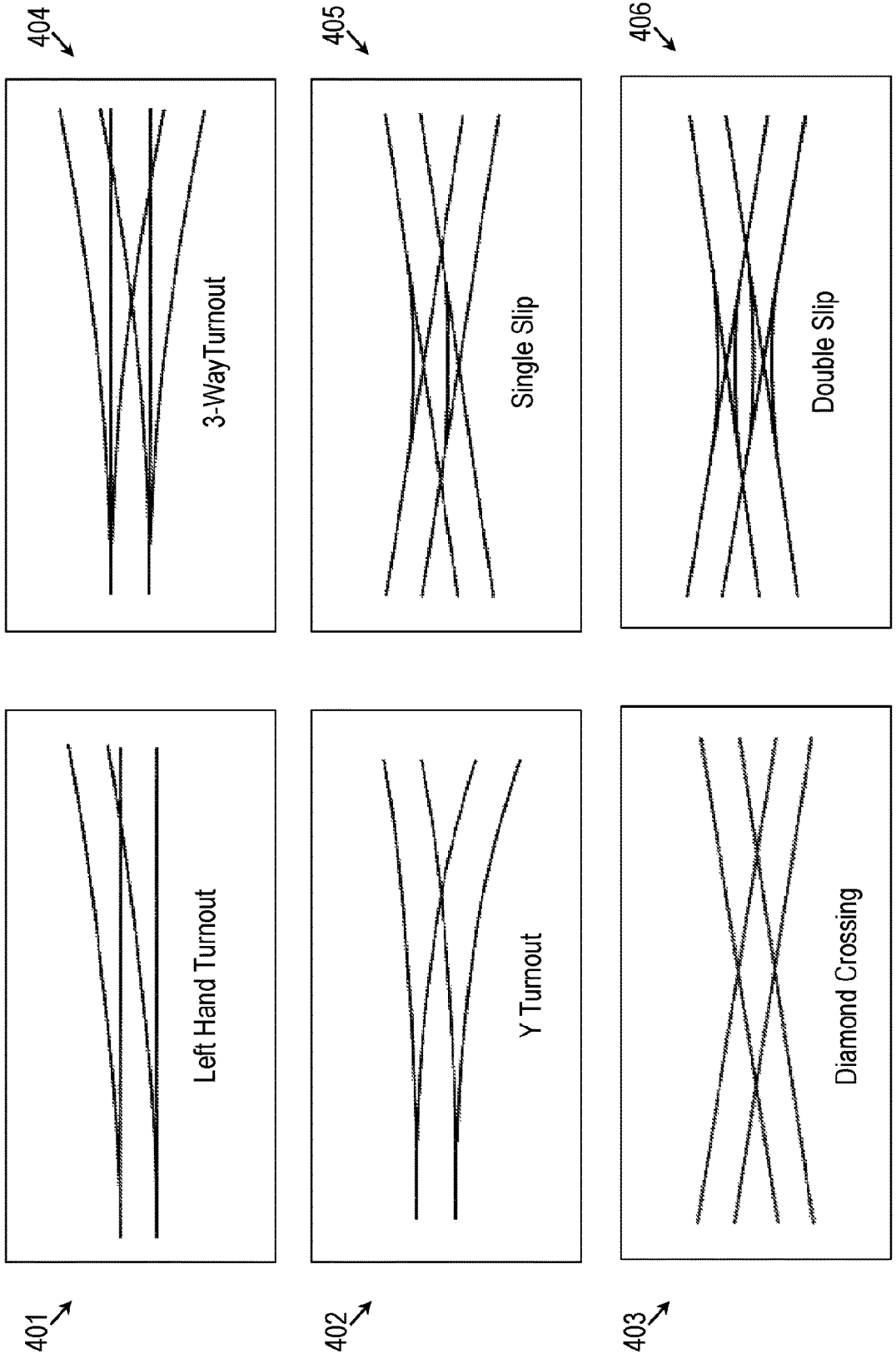
FIG. 4A shows examples of various rail turnouts, slips and crossings.

Reference is now made to FIG. 4A, which shows examples of various rail turnouts, slips and crossings. Illustrations 401, 402, 403, 404, 405 and 406 show a complexity of imaging of such situations, in which a forward-looking on-board system for collision avoidance (such as system 100 described above with respect to FIG. 1A or system 200 described above with respect to FIG. 2) should be able to automatically determine the respective rail (path) on which the train will travel on beyond such turnouts, slips and crossings. According to some embodiments, systems and methods disclosed herein are capable of automatically determining such instances.

Figure 4B:
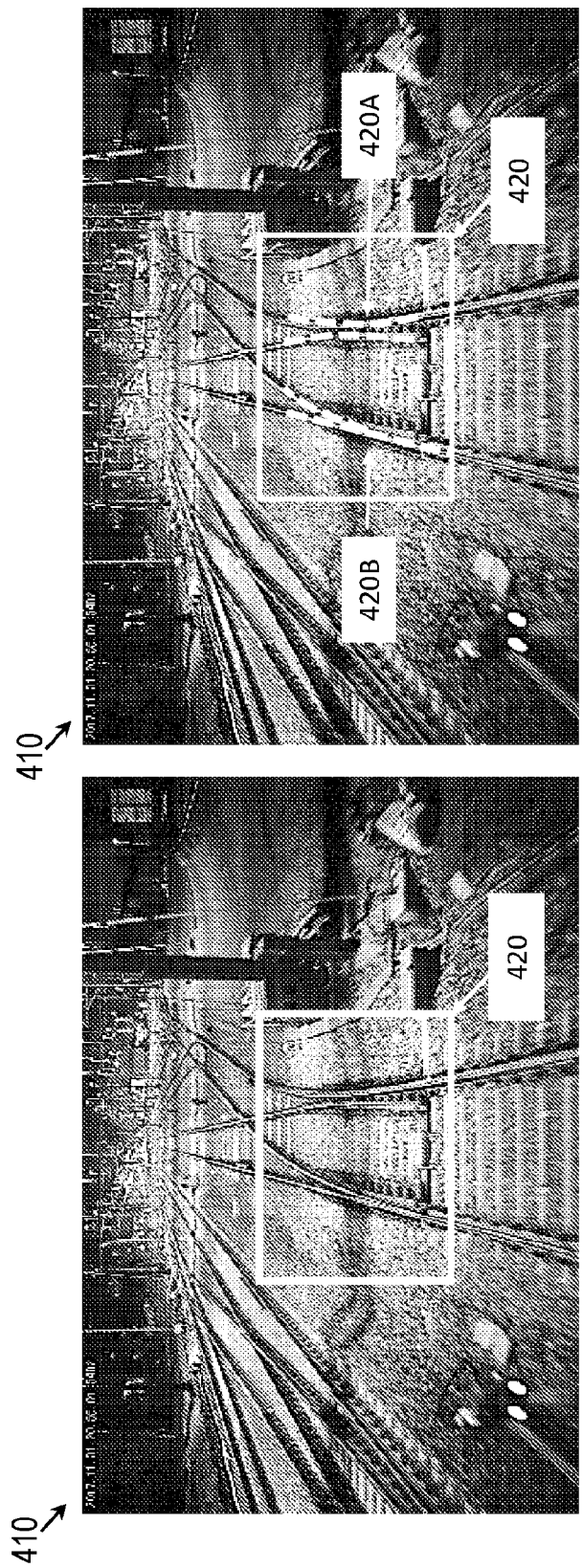
FIG. 4B shows an example of a rail switch turnout, as image framed by a forward-looking on-board imaging sensor, and an outlined part of a track that determine optional paths of the train beyond that switch.

Reference is now made to FIG. 4B, which shows an example of a rail switch turnout 410, as image framed by a forward looking on board imaging sensor (e.g., imaging sensor 110 described above with respect to FIG. 1A), and an outlined parts of a track 420 (thick broken lines) that determine optional paths of the train beyond that switch. Arrow 420a points at the open side of the switch and arrow 420b points at the closed side of the switch—and this determines the switch state, leading the train to the right track from this switch. Such determination of the switch state is a key element according to some embodiments of the invention. According to some embodiments, systems and methods disclosed herein are capable of determining the correct train path in the presence of switches that may also change their state over time, even as the train approaches the switch.

Reference is now made to FIGS. 5A, 5B, 5C and 5D, which are schematic illustrations of various approaches of training and inferring of a neural network for rails and switches states detection (RSSD NN) 500 for identifying a current railway path of a train, according to some embodiments of the invention.

RSSD NN 500 as described below with respect to FIGS. 5A, 5B, 5C and 5D may be similar to RSSD NN 124 of RSSD module 120 of system 100 as described above with respect to FIG. 1A. Input image frames 502, 512, 522 and 532 may be obtained by, for example, imaging sensor(s) 110 of system 100 as described above with respect to FIG. 1A.

Figures 5A, 5B:
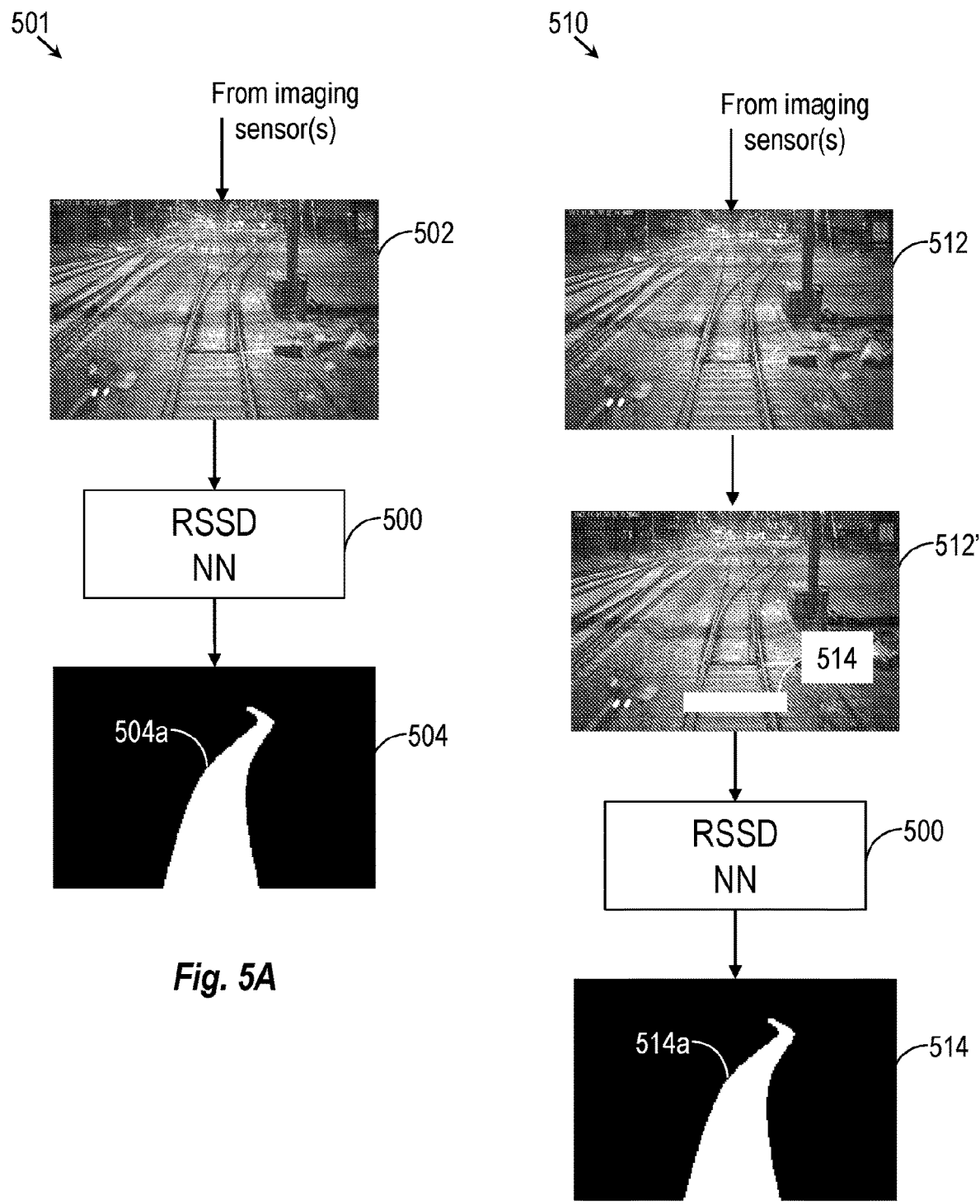
FIGS. 5A, 5B, 5C and 5D are schematic illustrations of various approaches of training and inferring of a neural network for rails and switches states detection (RSSD NN) for identifying a current railway path of a train, according to some embodiments of the invention.

FIG. 5A illustrates a simple approach (or process) 501 of an input image frame 502 and its segmentation mask prediction 504 showing a current railway path 504a of the train, according to some embodiments of the invention. During a training phase of RSSD NN 500, segmentation mask prediction 504 may be determined offline by, for example, human-controlled segmentation/annotation process. Accordingly, the neural network RSSD NN 500 may be trained to generate, in the inferring stage thereof, segmentation mask prediction 504 identifying current railway path 504a of the train based on input image frame 502.

One disadvantage of approach 501 for training and inferring of RSSD NN 500 may be that the context of accessing and processing of image frame sequences is not exploited, as each image frame is segmented separately and independently. Another disadvantage may be that when the train passes through a switch, and the two rails (the path and the turnout) appear at the bottom of the image frame (e.g., at the minimal image framed distance), there is an unsolvable ambiguity to distinguish the path from the turnout. Another disadvantage may be that a switch location is not detected or marked in any way.

FIG. 5B shows a simplified approach (or process) 510 of incorporating a history element into RSSD NN 500. Approach 510 may include adding a graphic mark 514 (e.g., the history element) at the bottom (and/or at the top) of an input image frame 512 for a desired path rail 514a, in their respective locations at the bottom/top row of input image frame 512—marked in the drawing 512'.

An advantage of approach 510 may be that it provides an added information when crossing a switch for a correct path segmentation. One disadvantage of approach 510 may be that the graphic mark enlarges the size of input image frame 512 or forces a change of input image frame 512 resizing at the input to the neural network, resulting in, for example, a loss of some image frame information because of interpolations. Another disadvantage of approach 510 may be that the only information used is the bottom/top rows of an image frame, whereby all other image frame information is disregarded in the context of the history that evolves from frame to frame, and moreover the switch location is also not detected or marked in any way.

Figure 5C:
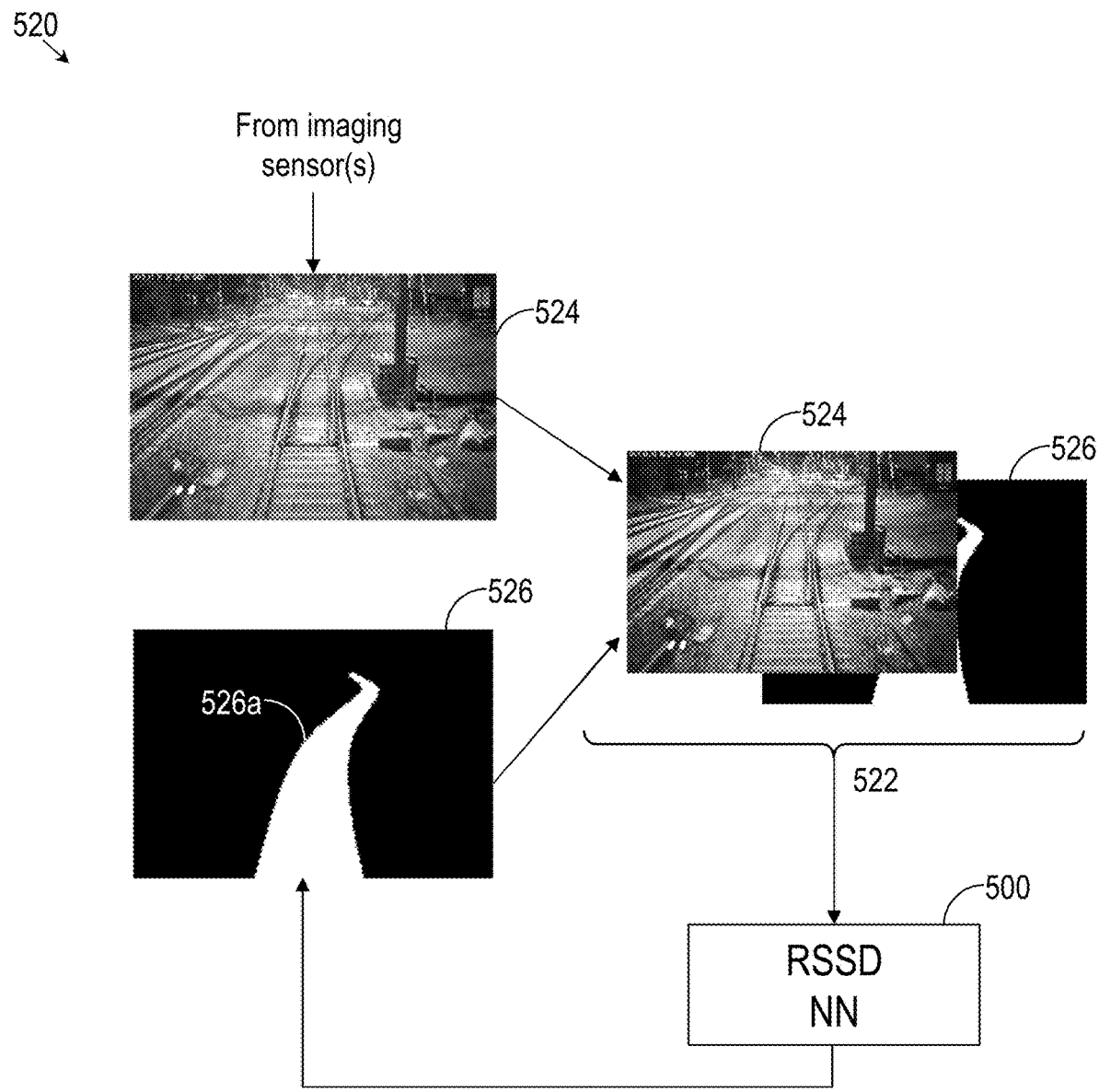

FIG. 5C shows an improved approach (or process) 520 of incorporating a history element into RSSD NN 500. Approach 520 may include generating an input data structure 522 that includes a current input image frame 524 and a segmentation mask prediction 526 of an image frame preceding to current image frame 524 (e.g., the history element) and providing input data structure 522 as an input into RSSD NN 500.

One advantage approach 520 may be that the crossing of a switch issue is solved. Another advantage may include that the image frame sequence context is utilized, as the history segmentation mask layer includes the most updated and/or predicted previous segmentation result that is derived progressively from previously processed sequenced image frame, as well as utilizing the entire detected path 526a of the image framed scene. Another advantage may be that original image frame size is maintained (e.g., height and width). Another advantage of approach 520 may include that is may have only little effect on a runtime of RSSD NN 500 (e.g., no more than additional ~0.5 ms out of 20 ms runtime per input data structure).

Figure 5D:
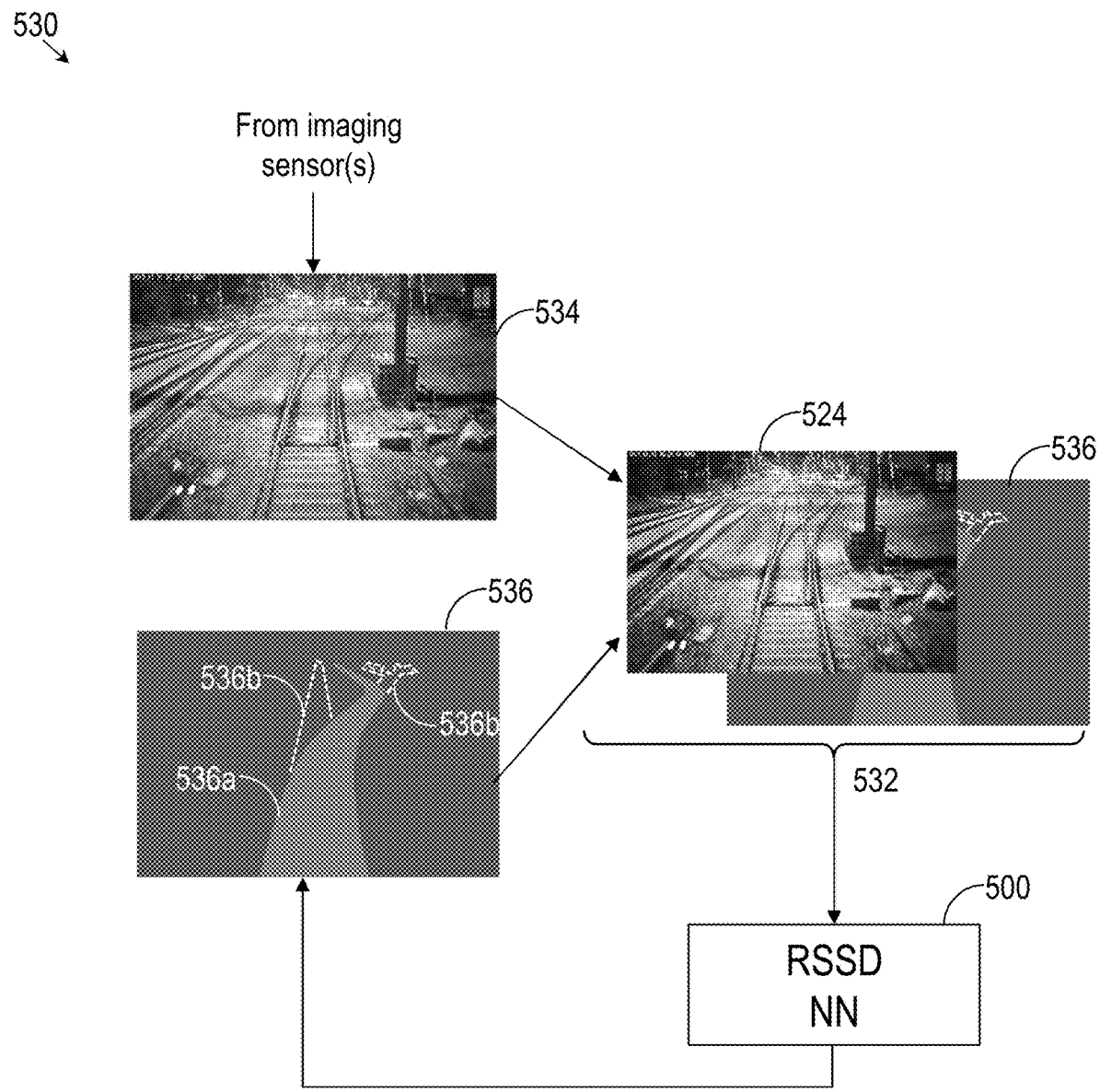

FIG. 5D shows a further improved approach 530 of incorporating a history element into RSSD NN 500. Approach 530 may include generating an input data structure 532 that includes a current input image frame 534 and a segmentation mask prediction 536 of an image frame preceding to current image frame 532 (e.g., the history element) and providing input data structure 532 as an input into RSSD NN 500, wherein segmentation mask prediction 536 of the preceding image frame (e.g., the history element) may include a current railway path 536a of the train and additional turnouts 536b from switches appearing along the path.

One advantage of approach 530 (e.g., of incorporating the cactus mask history into neural network 500) may be that the crossing of a switch issue is solved. Another advantage may be that the image frame sequence context is utilized, as the history segmentation mask layer includes the most updated previous segmentation result that is derived progressively from previously processed sequenced image frame, as well as utilizing the entire detected path of the image framed scene. Another advantage may be that original image frame size is maintained (height and width). Another advantage may be that switch detection is achieved by locating the pixels along the path that are adjoining the different labels of the selected path and the observed turnouts. Approach 530 may provide the combined information of the switch location and its respective switch state which is fundamental to the main driving functions of a train. Another advantage of approach 530 may include that is may have only little effect on a runtime of RSSD NN 500 (e.g., no more than additional ~0.5 ms out of 20 ms runtime per input data structure).

A basic railway switch consists of the pair of linked tapering rails, known as points (switch rails or point blades), lying between the diverging outer rails (the stock rails)—e.g., as shown in FIG. 4B. These points can be moved laterally into one of two positions to direct a train coming from the point blades toward the straight path or the diverging path. A train moving from the narrow end toward the point blades (e.g., it will be directed to one of the two paths depending on the position of the points) is said to be executing a facing-point movement. A trained train driver looks ahead while driving, visually detecting the upcoming switch location, and as the train eventually approaches the switch, he can also visually determine the switch state by the relative position of the point blades of the switch. The relative position of the point blades with respect to the stock rails determines the current path of the train.

The combined information of the path, switch location, switch state and turnouts, may all be represented in the history element (e.g., segmentation mask prediction 536 as described above with respect to FIG. 5D) of the rail layout ahead, while the real time scene image frame provides the updated visual information of the stock rails and the point blades of the switch(s) (e.g., input image frame 534 as described above with respect to FIG. 5D). Together they provide all the necessary information from which an accurate and correct path determination in RSSD NN 500 inference may be obtained. As the train traverses forward, the only expected changes in the actual rail physical layout are the switch states. As long as the switch states are not changed while the switches are actually visualized, approached and traversed by the imaging sensor(s), the use of the history element in RSSD NN 500 data block feed is sufficient for determining the current railway path of the train.

When switch states are changed (e.g., automatically or manually) while the train is approaching them or traversing across them, the history element that refers to the previous switch states (e.g., segmentation mask prediction 526 as described above with respect to FIG. 5C or segmentation mask prediction 536 as described above with respect to FIG. 5D) is intermittently in contradiction to the new states of the switches, and a new segmentation mask prediction. According to some embodiments, RSSD NN 500 may be trained to be capable of adapting the history element to such changes of switch states.

The description below provides some considerations to be accounted for when incorporating the history element as an input into RSSD NN 500, according to some embodiments of the invention.

First, there may be a risk of depending too heavily on the history element (e.g., previous segmentation mask predictions 526, 536 as described above with respect to FIGS. 5C, 5D, respectively). RSSD NN 500 may interpret the history element as the desired result, thereby disregarding the real time image frame input layer (e.g., input image frames 522, 532 as described above with respect to FIGS. 5C, 5D, respectively). In order to resolve of this issue, various multiple augmentations/updates of the history elements (e.g., independent of other image frame augmentations) may be used during the training stage of RSSD NN 500 according to some embodiments of the invention. Table 3 below provides possible augmentations/updates of the history element simulating different states of the system when mounted and operating on a train.

TABLE 3

Possible augmentations of the history element simulating different states of the system mounted on a train.

| Case | History element augmentation | Simulated system state |
|---|---|---|
| 1 | Empty (all zeros) | First frame after system is turned on, or states of ambiguity in system output. |
| 2 | Slight shifts to the sides-left and right | The train moved to the right or to the left. |
| 3 | Slight shifts up and down | The train moved backwards or forward. |
| 4 | Erase rows of pixels from the top | The camera at t-1 captured less of the scenery seen at t. |
| 5 | Add rows of pixels from the top | The camera at t-1 captured more of the scenery seen at t. |
| 6 | Replace labels of the top part-x% of the image frame, and use an additional augmentation from 2 to 5 | See detailed description below |

According to some embodiments, the history element augmentations/updates should be designed such that the information provided in the history element alone, will not be sufficient for RSSD NN 500 to generate an output that is identical with the correct path. This may force RSSD NN 500 not to ignore the information given in the real time updated scene image frame.

Second, the history element may be misleading in the cases where the switch state (and subsequently the path) changes while being image framed by the forward-looking camera. This may occur when, for example, a rail switch changes (e.g., manually or automatically), changing the actual path and the desired result, and the change is visible (e.g., in real time) to the imaging sensor and the system/method.

According to some embodiments, intermittently augmenting/updating (e.g., every once in T period of time, for example each 50-200 frames) the history element, e.g., during the training phase of RSSD NN 500 may resolve these issues.

According to some embodiments, the augmenting/updating of the history element may include deleting the history element completely (e.g., zeroing the segmented mask). In this case, RSSD NN 500 may make a decision based only on the input image frame only without the extra information given in the history, creating an artificial restart of history flow. This embodiment may disregard all information that was previously compiled into the history element layer and forces a new start as in the turning on of the system. This embodiment may be sufficient in applications or instances where no switch changes occur within the camera field, or when the train traverses switches.

According to some embodiments, the augmenting/updating of the history element may include deleting partially the history element. For example, upper x % of the history element mask is completely deleted or replaced by a special label that is not used in the annotation (e.g., during the training phase).

In some embodiments, zeroing only x % from the top of the history element (e.g. 75%) once every T period of time (~50-200 frames), thereby leaving (100-x)% of the history element bearing information. This may result in preserving the ability of RSSD NN 500 to maintain the designation of the desired path location, while not being effected in the case of a visible switch change, as this may generally occur in the upper parts of the image frame, far enough from the moving train. This, however, may result in an extensive loss of history information, and late or delayed path designations that occur at nearby proximities to oncoming switches.

In some embodiments, the augmenting/updating of the history element may include replacement of the upper x % of the history element mask (e.g., that includes rail labels, including path and turnouts), with a special label that is not used in the annotation process. In this case, special labels for parts of the history element may be used such that the information of the rail shape and location is retained, but the distinction between the rail path and the rail turnout is ignored. This may force the method to designate the rails in the scene as rail path or rail turnouts based on the updated input image frame only, while easing and facilitating the designation of the rail's shapes and locations.

History element augmentations/updates as described above may be given noticeable representation in the training sets that are used when training RSSD NN 500, such that RSSD NN 500 may learn those cases as well. History element augmentations/updates may be important in the training phase of RSSD NN 500, e.g., in order to familiarize the neural network with such augmented situations, thereby resulting in improved robustness of the result to such deviations and variations.

In some embodiments, the history element may include a temporal difference between "t−1" segmented mask and "t−2" segmented mask to thereby provide an improved tracking and compensations of the changing history element over time.

In some embodiments, the history element may include continuous values and not the current discrete constant values, wherein a soft value palette may be used in providing varying mask weights depending on the assurance or confidence level of the respective labels, and respective ranges from the imaging sensor(s).

In some embodiments, an improved training set for the neural network may be used, wherein the set may include compositions of ~80% real image frames and ~20% wrong/artificial image frames. These image frames may be used in switches, wherein the ~80% part will have the correct switch states, and the ~20% part will have the opposite switch states.

In some embodiments, the history element may be inserted in another location within the neural network rather than in input layer thereof. For example, the history element may be inserted at any location within the neural network before the last layer of the argmax thereof.

In some embodiments, at least one "ignore-region" may be added to the annotations of the input image frame. As typical image frame of the railway scene has a large region of background, which is a valid label, a major part of the loss calculation in the training process is done over the background and is quite easy. Therefore, the loss information it supplies is correct but doesn't reflect the achieved detection ability. The "ignore-region" is a region in which the loss calculation is disregarded. In a preferred implementation, designating random regions of the background with an ignore label, will provide a more balanced loss calculation for the regions of interest.

In some embodiments, weighing of the calculated loss over the image frame is used by the range of image frame regions or pixels from the imaging sensor during a training phase of RSSD NN 500, hence providing longer range scene objects a higher weight, thereby improving the performance along the more distant rail segments that are naturally smaller and finer.

Figure 6A:
FIG. 6A shows a rail scene following a traverse of a switch.

Reference is now made to FIG. 6A, which shows a rail scene 601 following a traverse of a switch. It is noted that without incorporating a history element in the segmentation process by the neural network (e.g., as described above with respect to FIGS. 5B, 5C and 5D) it would be difficult to rapidly determine the correct path the train is travelling.

Figure 6B:
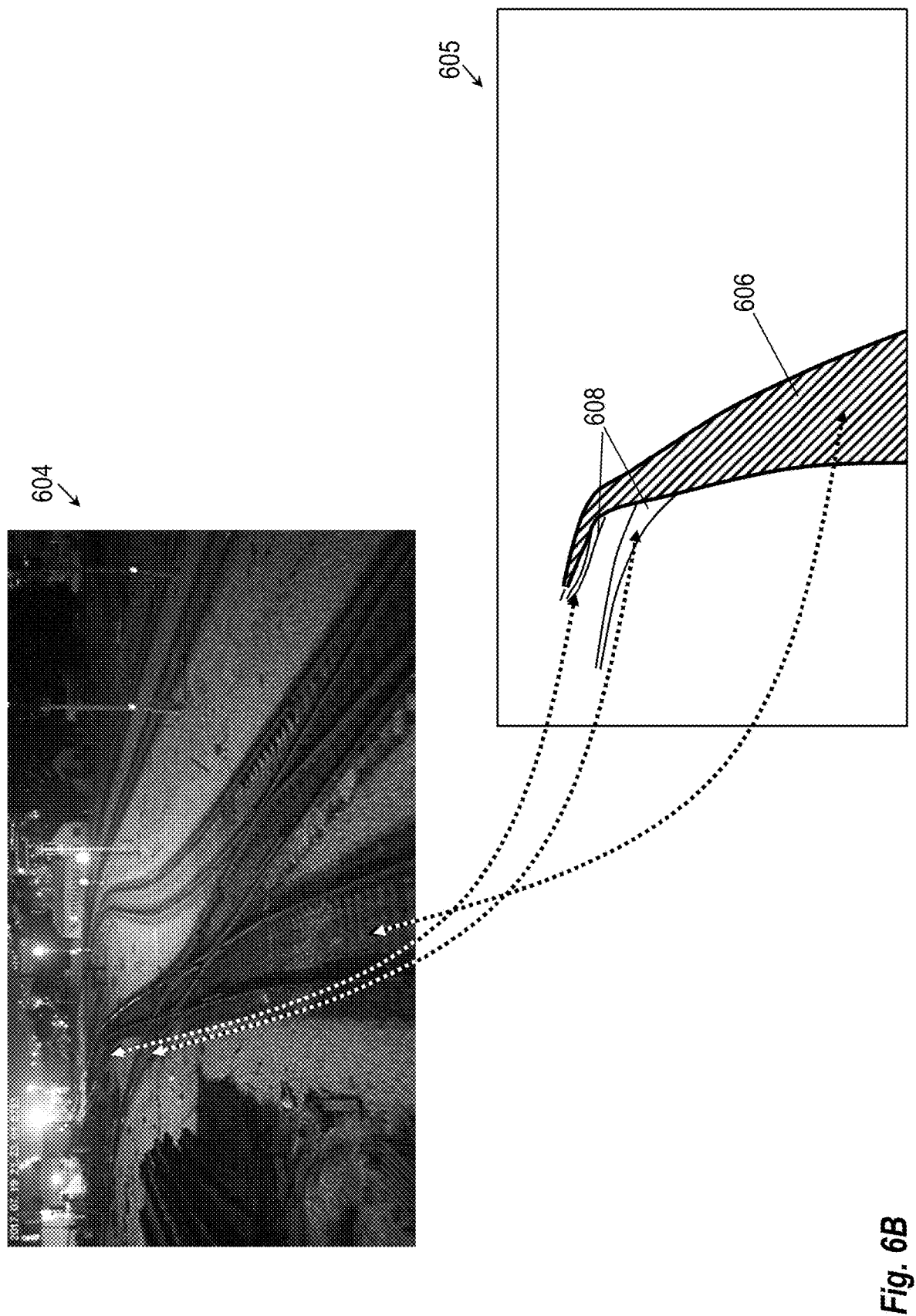
FIG. 6B shows an exemplary railway scene including a graphical mask of the train path and two impending switches with respective turnouts.

Reference is now made to FIG. 6B, which shows an exemplary railway scene 604 including a graphical mask 605 of the train path 606 and two impending switches with respective turnouts 608. It is noted that graphical mask 605 may be first annotated for the training phase of the neural network, and a similar graphical may subsequently generated in the inference phase of the neural network (e.g., as described above with respect to FIGS. 5C and 5D).

Figure 7A:
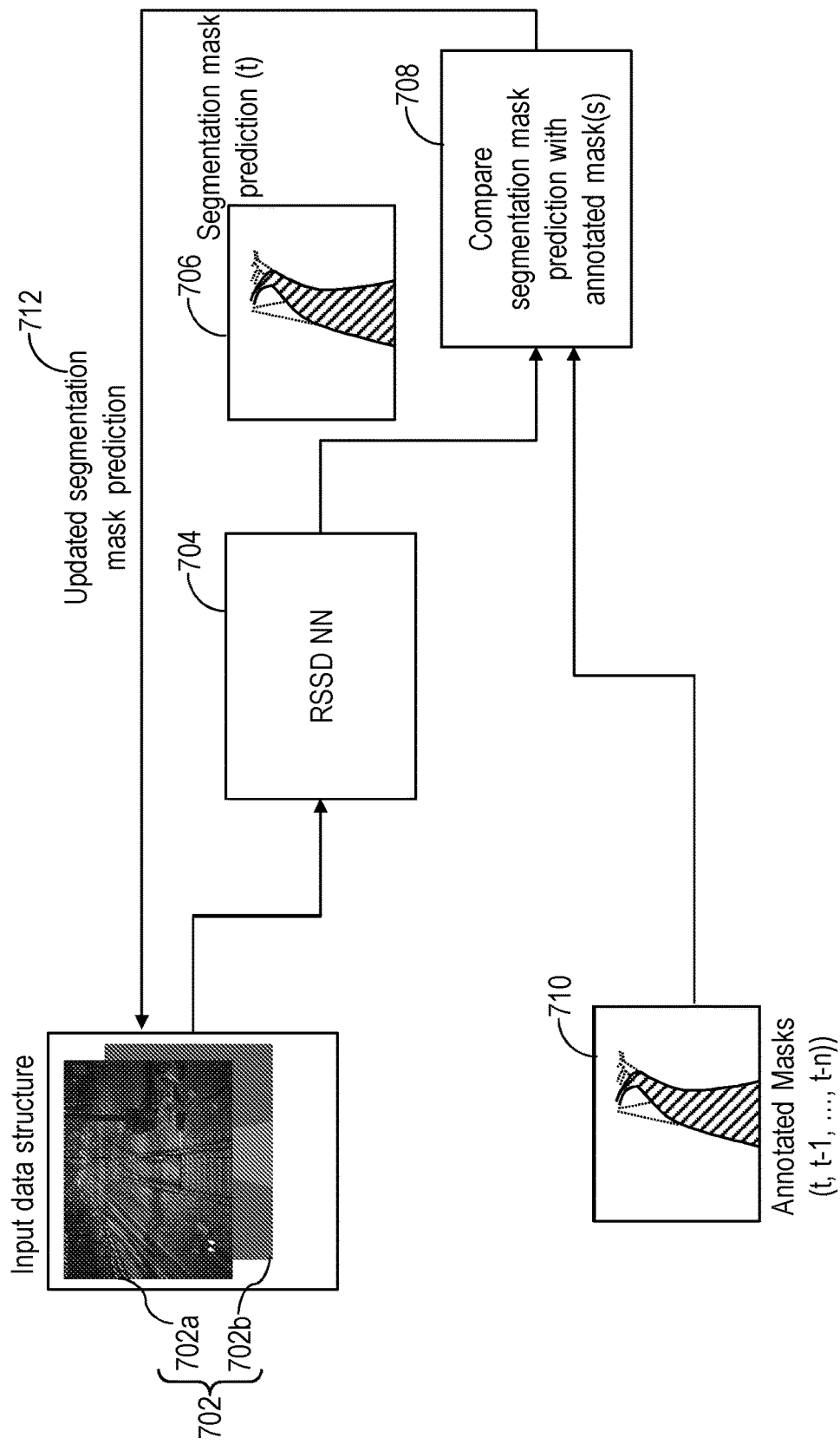
FIGS. 7A, 7B and 7C are flowcharts of an offline training phase of a neural network for rails and obstacles detection (RSSD NN), according to some embodiments of the invention.
Figure 7B:
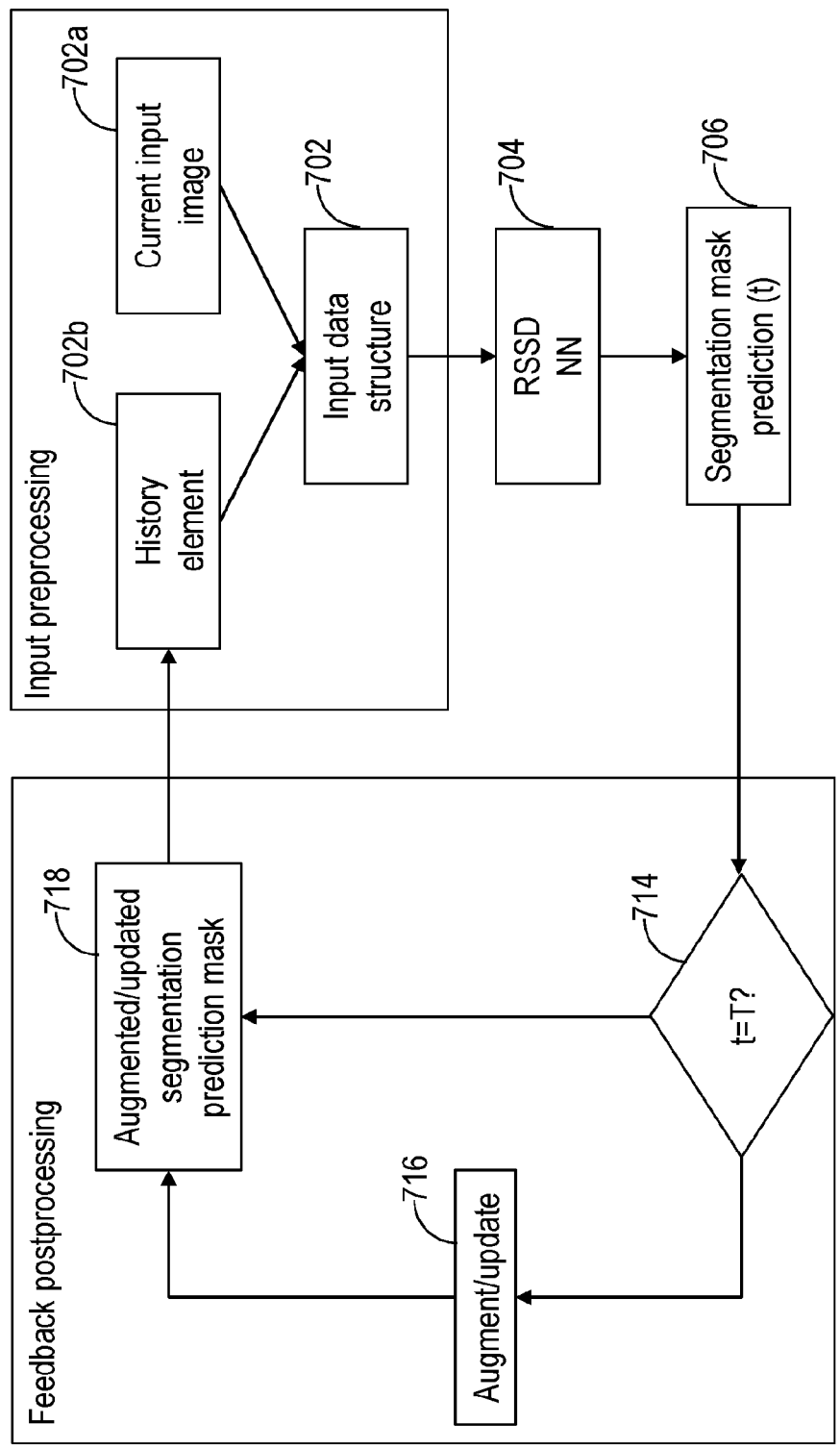
Figure 7C:
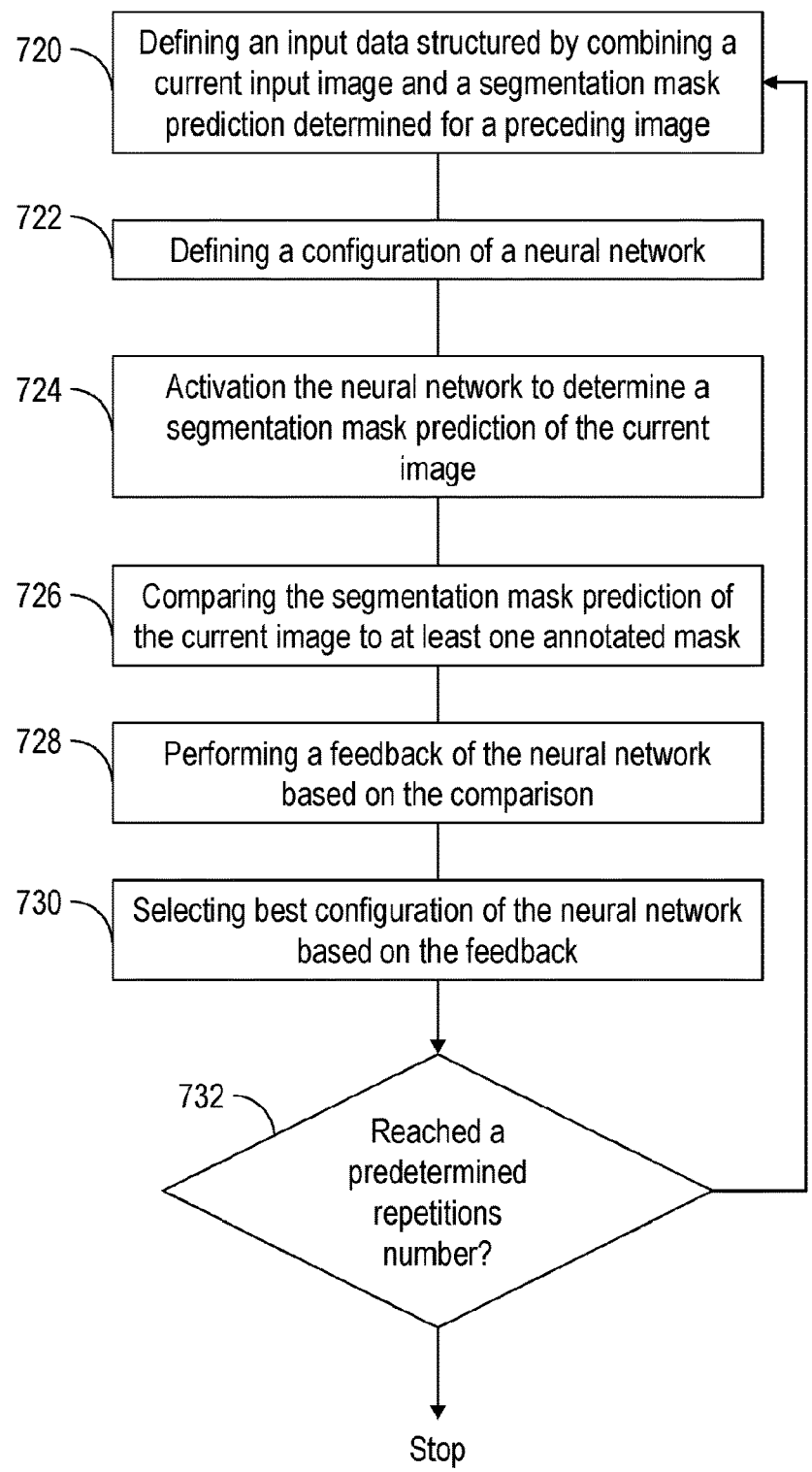

Reference is now made to FIGS. 7A, 7B and 7C, which are flowcharts 700a, 700b, 770c of an offline training phase of a neural network for rails and obstacles detection (RSSD NN), according to some embodiments of the invention.

FIG. 7A presents a flowchart 700a of an offline training phase of a RSSD NN 704. First, an input data structure 702 may be generated. Input data structure 702 may include a current input image frame 702a and a history element 702b. Current input image frame 702a may be obtained by imaging sensor(s) (e.g., such as imaging sensor(s) 110 described above with respect to FIG. 1A). History element 702b may include a segmentation mask prediction determined an image frame preceding to current image frame 702a. For example, the segmentation mask prediction of history element 702b may be like segmentation mask prediction 536 described above with respect to FIG. 5D and may include a current railway path of a train and additional turnouts from switches appearing along the current railway path.

Input data structure 702 may be then fed into RSSD NN 704. RSSD NN 704 may be, for example, similar to RSSD NN 122 of RSSD module 120 of system 100 as described above with respect to FIG. 1A or to RSSD NN 500 as described above with respect to FIGS. 5A, 5B, 5C and 5D. RSSD NN 704 may determine, based on input data structure 702, a segmentation mask prediction 706 of current input image frame 702a.

Segmentation mask prediction 706 of current input image frame 702a may be compared 708 to at least one annotated segmentation mask 710. An updated segmentation mask prediction 712 may be determined based on comparison 708 between segmented mask prediction 706 of current input image frame 702a and annotated segmentation mask(s) 710. Updated segmentation mask prediction 712 may be further combined into a new input data structure 702 as a new history element 702b, which may be further fed again into RSSD NN 704.

The process described in flowchart 700a may be based on a compilation of an image frame database of typical, extreme and augmented/updated railway scenes (e.g., as described above with respect to FIG. 5A, 5B, 5C, 5D and Table 3). Manual and/or computerized annotations may be applied to the database image frames, and respective multilabel masks may be generated (e.g., 3 labels including, e.g., background, the current railway path pursued by the train, and turnout paths not selected by the respective switches).

In some embodiments, history element 702*b* may be simulated by using annotated segmentation mask(s) of current input image frame 702*a* image frame up to 8 image frames before current input image frame 702*a*. This, for example, enables the simulation of different train velocities.

In various embodiments, e.g., in order to enlarge the database, input image frames 702*a* and/or annotated mask(s) 710 may be augmented/updated to simulate possible previous image frame's predictions that might have not occurred in the compiled training database.

In some embodiments, segmentation mask prediction 706 of current input image frame 702*a* may be also augmented/updated. The augmentation/updating of segmentation mask prediction 706 may be performed, for example, each T image frames 714 (e.g., each 50-200 image frames). For example, FIG. 7B shows a flowchart 700*b* in which each T segmentation mask predictions 706 (e.g., T=5-200 image frames) may be augmented/updated 716 to generate augmented/updated segmentation mask prediction 718 that may be subsequently fed into a new input data structure 702 as a new history element 702*b*. Various examples of the augmentation/updating process are described above with respect to FIGS. 5A, 5B, 5C and 5D and Table 3.

FIG. 7C shows a flowchart 700*c* of general stages of an offline training phase of a neural network (e.g., RSSD NN 704 described above with respect to FIGS. 7A and 7B).

At stage 720, an input data structure may be defined by combining a current input image frame and a segmentation mask prediction determined for a preceding image frame (e.g., such as input data structure 702 described above with respect to FIGS. 7A and 7B).

At stage 722, a configuration (e.g., segnet and/or any other) of the neural network (e.g., RSSD NN 704 described above with respect to FIGS. 7A and 7B) may be defined.

At stage 724, the neural network may be activated to produce a segmentation mask prediction of the current image frame (e.g., segmentation mask prediction 706 described above with respect to FIGS. 7A and 7B). The activation of the neural network may, for example, include defining an region of interest (ROI) in the current input image frame the vicinity of the center rails, cropping the image frame from the edges by a specified number of pixels, resizing the cropped image frame to the neural network input size, exposing the neural network to one image frame and finally activating the neural network to determine the segmentation mask prediction of the current image frame.

At stage 726, the segmentation mask prediction of the current image frame may be compared to at least one annotated mask (e.g., annotated mask 710 described above with respect to FIG. 7A).

At stage 728, a feedback of the neural network may be performed based on the comparison between the segmentation mask prediction of the current image frame and the annotated mask(s).

At stage 730, best configuration of the neural network so far may be selected based on the feedback thereof.

At stage 732, process 700*c* may go back to stage 720 and repeat stages 720-730 with a new current image frame received from imaging senor(s) if a predetermined number of repetitions is not reached, or otherwise process 700*c* may be stopped.

Figure 8:
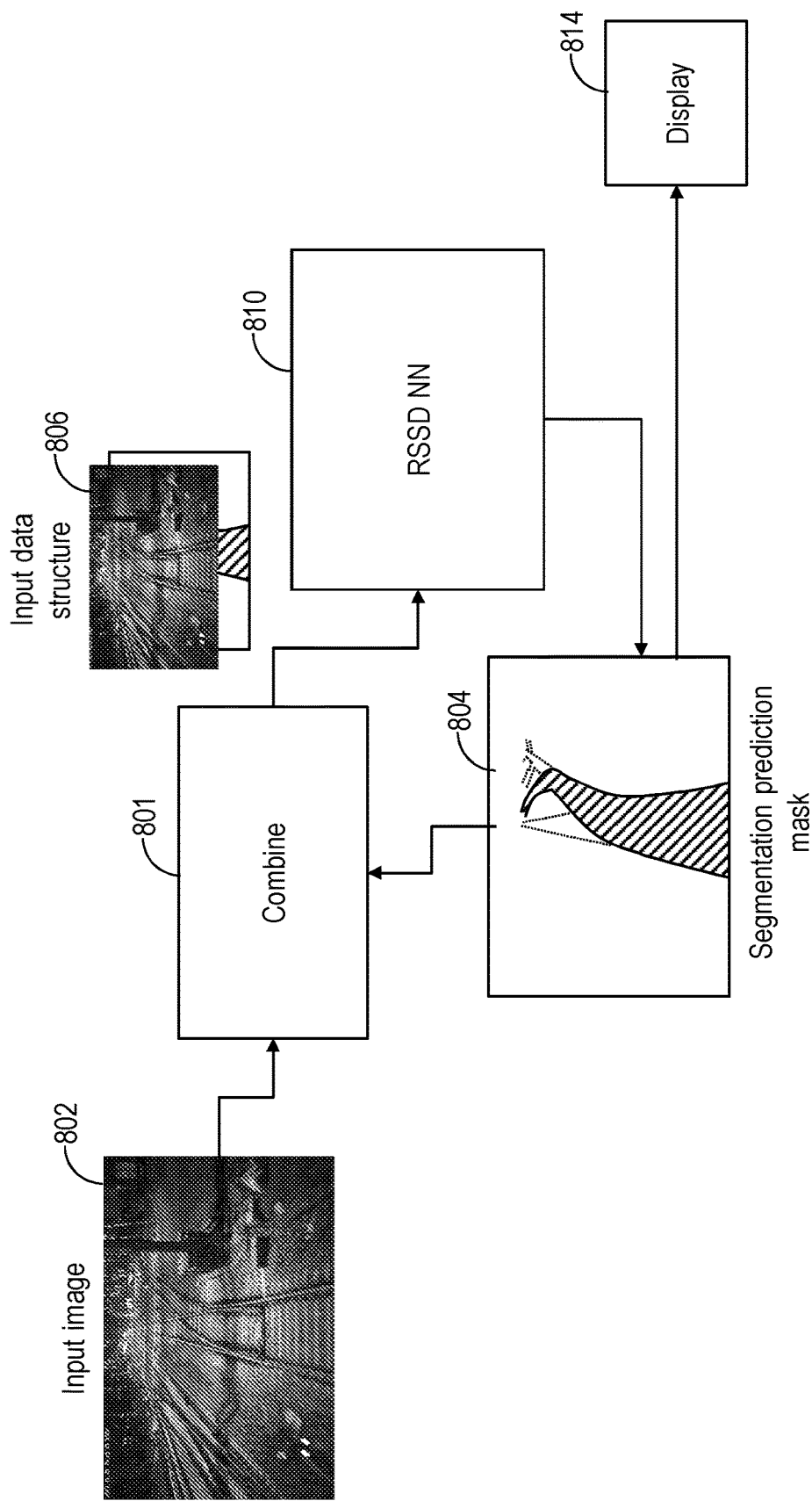
FIG. 8 is a flowchart of a forward inference process of a neural network for rails and obstacles detection (RSSD NN), according to some embodiments of the invention.

Reference is now made to FIG. 8, which is a flowchart 800 of a forward inference process of a neural network for rails and obstacles detection (RSSD NN), according to some embodiments of the invention.

First, a current input image frame 802 obtained by imaging sensor(s) may be combined 801 with a segmentation mask prediction 804 determined for an image frame preceding to current image frame 802 (e.g., a history element), to thereby generate an input data structure 806. For example, the imaging sensor(s) may be like imaging sensor(s) 110 descried above with respect to FIG. 1A.

Input data structure 806 may be fed into a RSSD NN 810 that may determine a segmentation mask prediction 804 of current input image frame 802 based on input data structure 806. For example, RSSD NN 810 may be similar to RSSD NN 122 described above with respect to FIG. 1A, RSSD NN 500 descried above with respect to FIGS. 5A, 5B, 5C and 5D, and/or RSSD NN 704 described above with respect to FIGS. 7A, 7B and 7C.

Segmentation mask prediction 804 of current input image frame 802 may be displayed 814 to a driver of a train. Segmentation mask prediction 804 of current input image frame 802 may be further combined 801 as a new history element with a new current input image frame 802 for preparing a new input data element 806 to be fed to RSSD NN 810.

Figure 9:
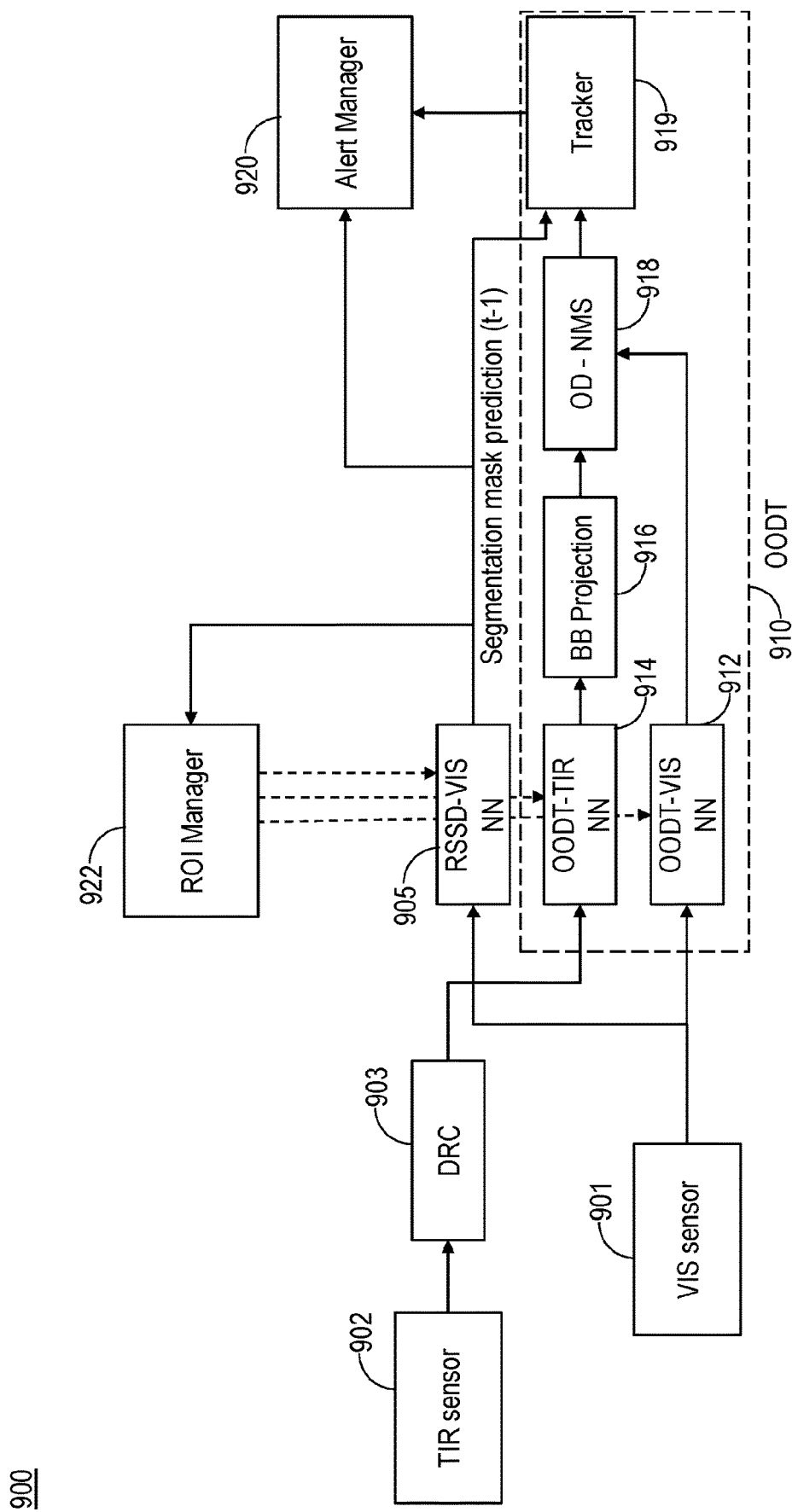
FIG. 9 is a schematic block diagram of a first specific implementation of a system for rails and objects detection, according to some embodiments of the invention.

Reference is now made to FIG. 9, which is a schematic block diagram of a first specific implementation of a system 900 for rails and objects detection, according to some embodiments of the invention.

According to some embodiments, system 900 may be similar to system 100 for rails and objects detection described above with respect to FIG. 1A. System 900 may include a visual band imaging (VIS) sensor 901 and a thermal infrared (TIR) sensor 902. VIS sensor 901 and TIR sensor 902 may be similar to imaging sensor(s) 110 described above with respect to FIG. 1A. VIS sensor 901 and TIR sensor 902 may be mounted on a train in a forward-looking configuration such that the sensors face a direction of travel of the train. System 900 may include a dynamic range compression module (DRC) 903 that may be applied to image frames from TIR sensor 902.

Image frames from VIS sensor 901 may be fed into a rails and switches states detection neural network 905 (e.g., indicated as RSSD-VIS NN 905 in FIG. 9). RSSD-VIS NN 905 may be similar to RSSD NN 122, RSSD NN 500, RSSD NN 704 or RSSD NN 810 as described above with respect to FIG. 1A, FIGS. 5A-5D, FIGS. 7A-7C and FIG. 8, respectively. RSSD-VIS NN 905 may be configured to determine segmentation mask predictions and current railway paths of the train based on at least some of image frames obtained by VIS sensor 902 (e.g., as described above with respect to FIG. 1A). VIS sensor 901 may be sensitive both in daytime hours as well as low light and nighttime hours, enabling for example switchyard operation of system 900 that is typically lit at night and operated continually as well as mainline operation System 900 may include an objects and obstacles detection and tracking (OODT) module 910. OODT module 910 may be similar to OODT module 130 described above with respect to FIG. 1A. OODT module 910 may be configured to detect and track objects and obstacles based on at least some of image frames received from VIS sensor 901 and from TIR sensor 902.

OODT module 910 may include at least one of: an OODT neural network 912 for image frames obtained by VIS sensor 901 (e.g., indicated as OODT-VIS NN 912 in FIG. 9), an OODT neural network 914 for image frames obtained by TIR sensor 902 (e.g., indicated as OODT-TIR NN 914 in FIG. 9A), a bounding box (BB) coordinate projection module 916 (e.g., indicted as BB projection 916 in FIG. 9A) that projects the BBs of TIR sensor 901 based object detections onto VIS sensor 901 coordinates, such that these BBs are associated in VIS image frame coordinates by an object detection non-maximum suspension detection module 918 (e.g., indicted as OD-NMS 918 in FIG. 9A, and subsequently fed into a spatiotemporal tracker module 919.

OODT module 910 may include a tracker module 919 that may receive the segmentation mask predictions from RSSD-VIS NN 905 (e.g., for each current input image frame being proceed by OODTC module 910, a segmentation mask prediction determined for an image frame preceding to the current input image frame may be supplied), such that tracker parameters and scoring may be performed as a function of the object coordinates relative to the detected current railway path or turnouts determined by RSSD-VIS NN 905.

System 900 may include an alert manager module 920 for determination of alert levels of tracked objects relative to the determined current railway path and turnouts, as well as rail-based computed range to the respective bounding boxes thereby determining response times of the train's stopping or slowdown strategy including the computation of deceleration required, and predicted impact time etc. System 900 may include a region of interest (ROI) manager module 922 for the control of such ROIs for RDSS-VIS NN 905, and ODNN-VIS NN 912 and ODNN-TIR NN 914.

Figure 10:
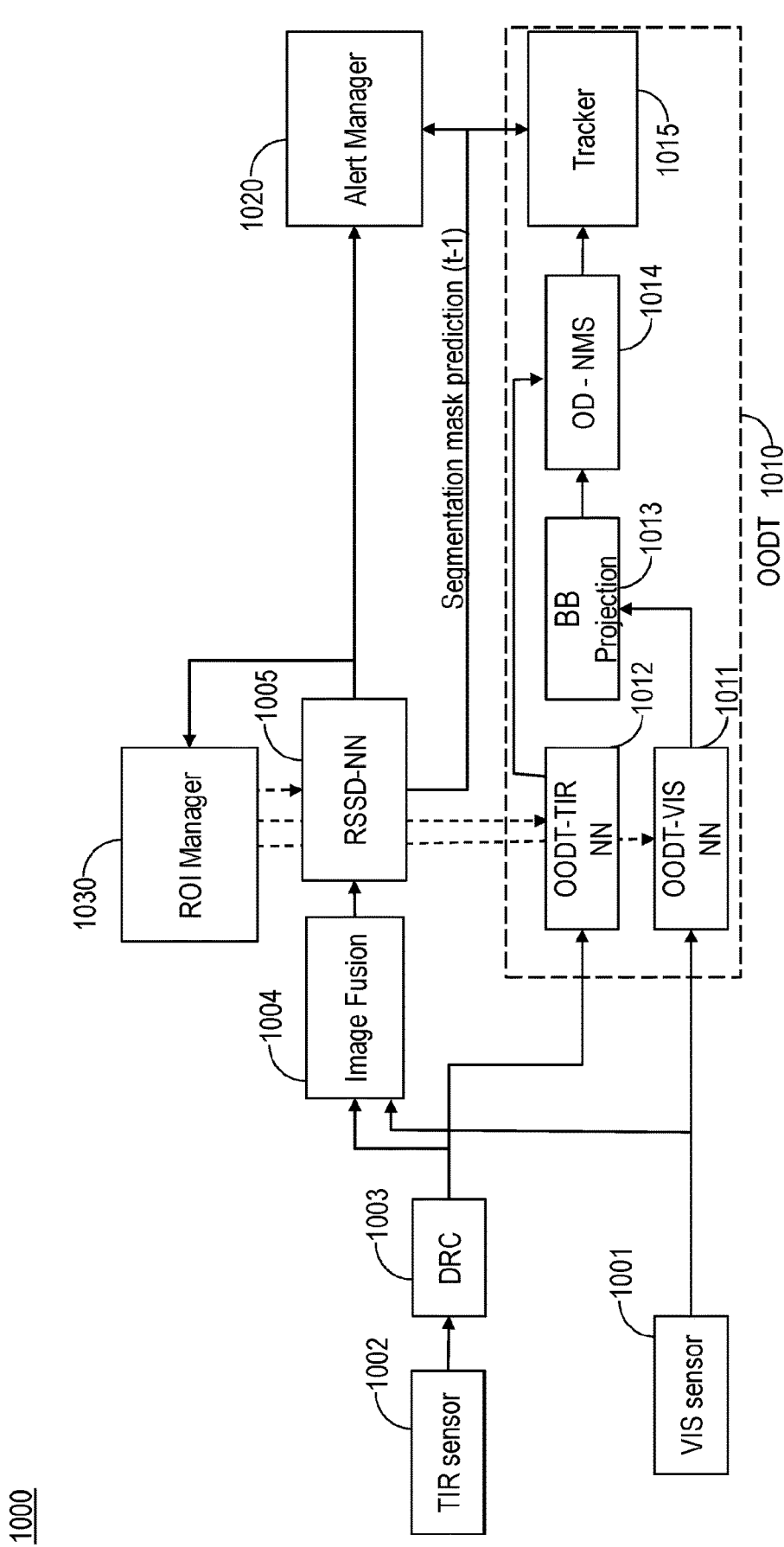
FIG. 10 is a schematic block diagram of a second specific implementation of a system for rails and objects detection, according to some embodiments of the invention.

Reference is now made to FIG. 10, which is a schematic block diagram of a second specific implementation of a system 1000 for rails and objects detection, according to some embodiments of the invention.

According to some embodiments, system 1000 may be similar to system 100 for rails and objects detection described above with respect to FIG. 1A. System 1000 may include a visual band imaging (VIS) sensor 1001 and a thermal infrared (TIR) sensor 1002. VIS sensor 1001 and TIR sensor 1002 may be similar to imaging sensor(s) 110 described above with respect to FIG. 1A. VIS sensor 1001 and TIR sensor 1002 may be mounted on a train in a forward-looking configuration such that the sensors face a direction of travel of the train. System 1000 may include a dynamic range compression module (DRC) 1003 that may be applied to image frames from TIR sensor 1002.

System 1000 may include an image frame fusion module 1004 into which image frames from VIS sensor 1001 and image frames from TIR sensor 1002 may be fed. Image frame fusion module 1004 may fuse image frames from VIS sensor 1001 and image frames from TIR sensor 1002 to yield fused image frames and subsequently feed the fused image frames into a rails and switches states detection neural network (RSSD-Fusion NN) 1005. RSSD-Fusion NN 1005 may be similar to RSSD NN 122, RSSD NN 500, RSSD NN 704, RSSD NN 810 or RSSD-VIS NN 905 as described above with respect to FIG. 1A, FIGS. 5A-5D, FIGS. 7A-7C, FIG. 8 and FIG. 9, respectively. RSSD-Fusion NN 1005 may be configured to determine segmentation masks predictions and current railway paths of the train based on at least some of the fused image frames (e.g., as described above with respect to FIG. 1A).

System 1000 may include an objects and obstacles detection and tracking (OODT) module 1010. OODT module 1010 may be similar to OODT module 130 described above with respect to FIG. 1A. OODT module 1010 may be configured to detect and track objects and obstacles based on at least some of image frames received from VIS sensor 1001 and from TIR sensor 1002.

OODT module 1001 may include at least one of: an OODT neural network 1011 for image frames obtained by VIS sensor 1001 (e.g., indicated as OODT-VIS NN 1011 in FIG. 10), an OODT neural network 1012 for image frames obtained by TIR sensor 1002 (e.g., indicated as OODT-TIR NN 1012 in FIG. 10), a bounding box (BB) coordinate projection module 1013 (e.g., indicted as BB projection 1013 in FIG. 10) that projects the BBs of VIS sensor 1001 based object detections onto TIR sensor 1002 coordinates, such that these BBs are associated in TIR image frame coordinates by an object detection non-maximum suspension detection module 1014 (e.g., indicted as OD-NMS 918 in FIG. 9A, and subsequently fed into a spatiotemporal tracker module 919.

OODT module 1010 may include a tracker module 1015 that may receive the segmentation mask predictions from RSSD-Fusion NN 1005 (e.g., for each current input image frame being proceed by OODTC module 1010, a segmentation mask prediction determined for an image frame preceding to the current input image frame may be supplied), such that tracker parameters and scoring may be performed as a function of the object coordinates relative to the detected current railway path or turnouts determined by RSSD-Fusion NN 1005.

System 1000 may include an alert manager module 1020 for determination of alert levels of tracked objects relative to the determined current railway path and turnouts, as well as rail-based computed range to the respective bounding boxes thereby determining response times of the train's stopping or slowdown strategy including the computation of deceleration required, and predicted impact time etc. System 1000 may include a region of interest (ROI) manager module 1030 for the control of such ROIs for RDSS-Fusion NN 1005, and ODNN-VIS NN 1011 and ODNN-TIR NN 1012.

Figure 11:
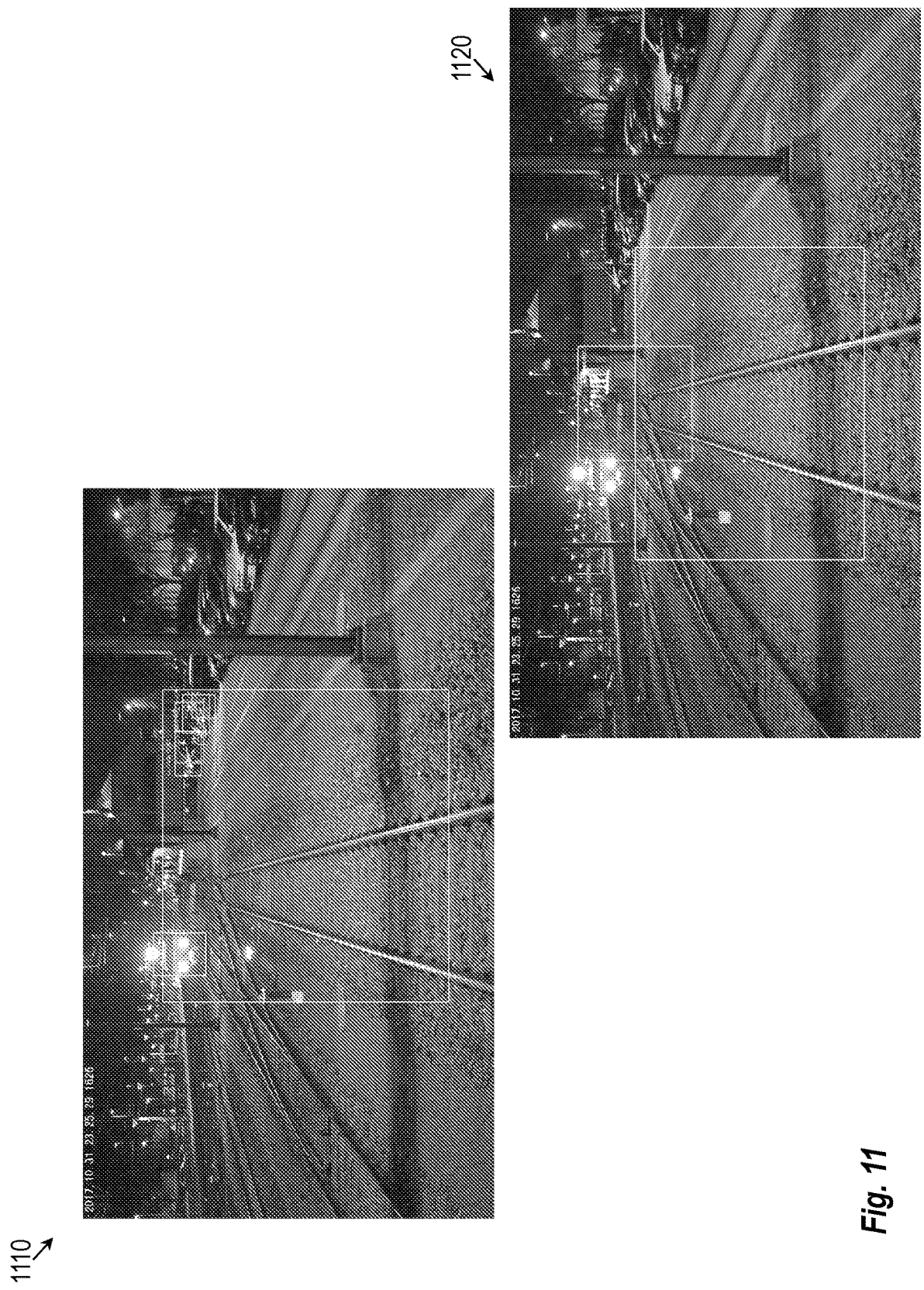
FIG. 11 shows an example of two implementations of an object and obstacle detection and tracking neural network (OODT NN) applied on image frames from a VIS imaging sensor, according to some embodiments of the invention.

Reference is now made to FIG. 11, which shows an example of two implementations of an object and obstacle detection and tracking neural network (OODT NN) applied on image frames from a VIS imaging sensor, according to some embodiments of the invention.

Illustrations 1110 shows a large single region of interest (ROI) (e.g., with extended capabilities and complexity) result of an OODT NN (e.g., OODT-VIS or OODT-TIR described above with respect to FIGS. 9 and 10) that is capable of detecting larger objects (e.g., locomotive) yet fails to detect the smaller objects (e.g., human) at longer distances due to resizing of the ROI to the OODT NN size.

Alternatively, illustration 1120 shows a result of OODT NN with two separate ROIs (with limited complexity), wherein the larger ROI supports the detection of the shorter ranges (e.g., larger objects) hence less sensitive to resizing limitations, and the smaller ROI supporting more extended ranges since due to its dimensions no resizing is necessary, therefore smaller (e.g., human objects) are detected. This implementation calls for additional control of the smaller ROI coordinates such that it remains centered on the current railway path (even in curved rails) determined by RSSD NN (e.g., such as RSSD-VIS NN or RSSD-Fusion NN described above with respect to FIGS. 9 and 10, respectively) as there is a particular interest in objects and potential obstacles that are near or within the safety zone. In addition to the improved detection of small objects at extended ranges, such multiple lower complexity OODT NNs may be implemented in parallel, e.g., multithreading, thereby resulting in considerable processing acceleration.

Figure 12:
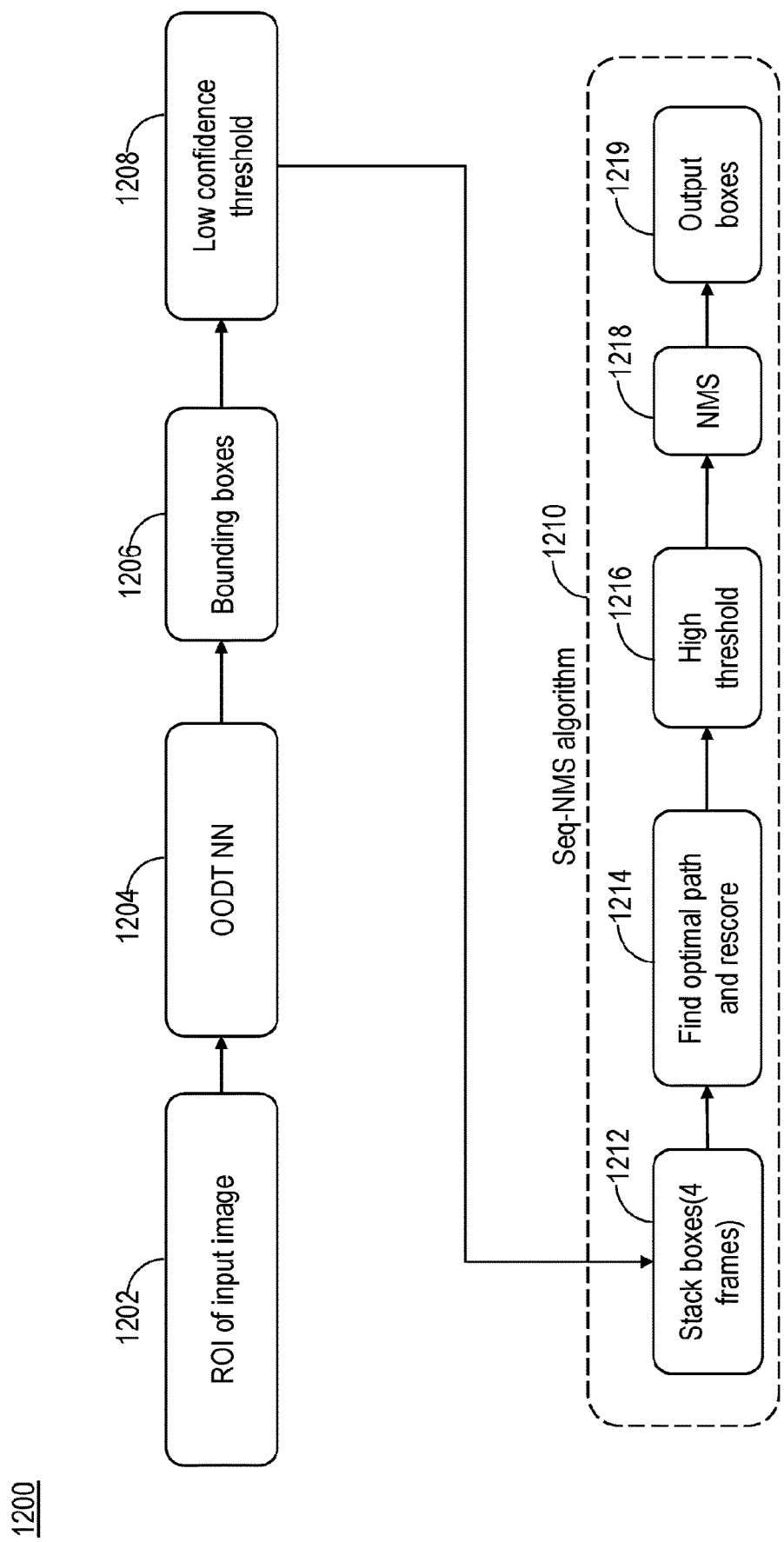
FIG. 12 is a flowchart of a process for an objects and obstacles detection and tracking neural network (OODT NN) applied within a region of interest (ROI) of an image frame, according to some embodiments of the invention.
Figure 13:
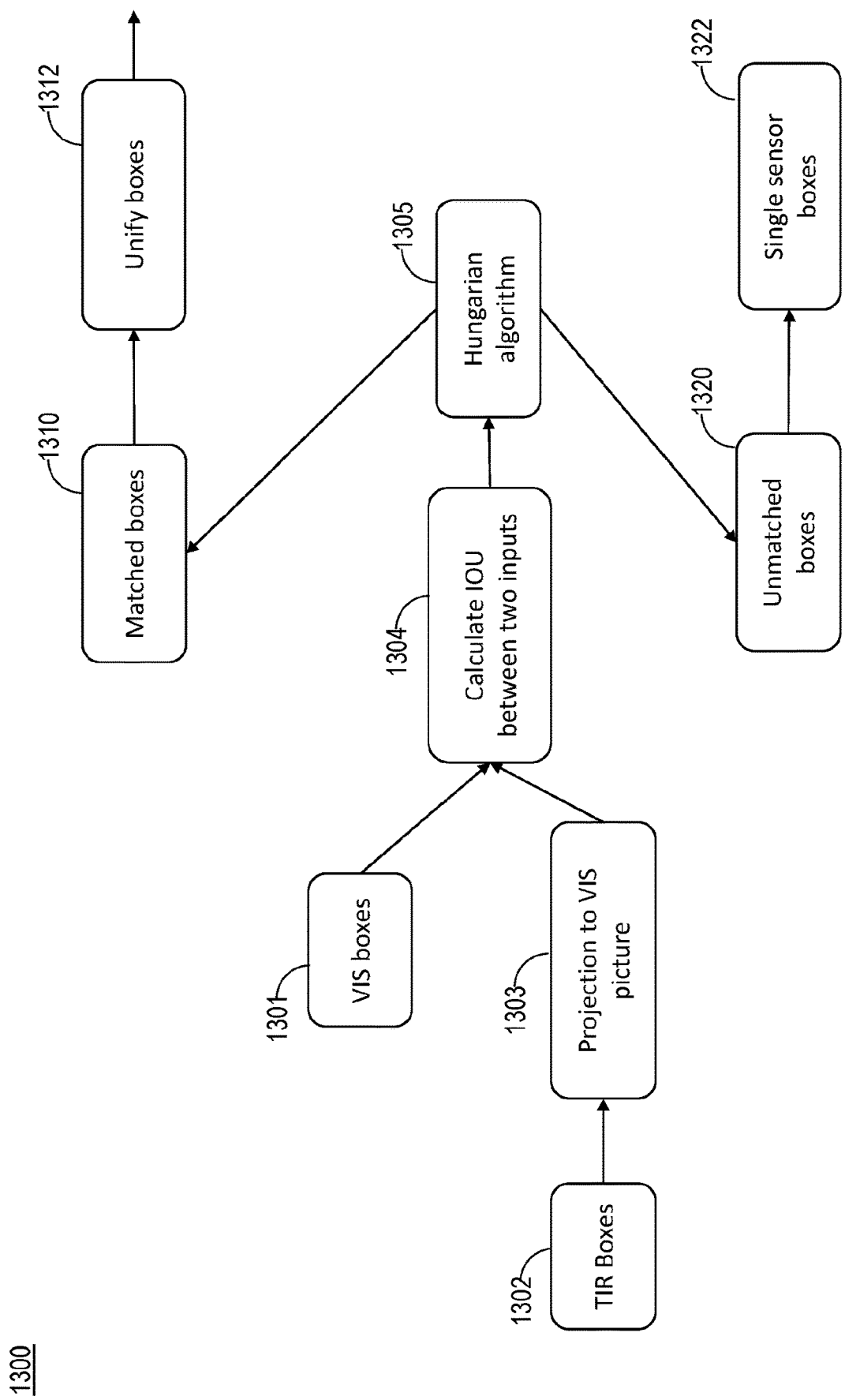
FIG. 13 is a flowchart of a process for fusion of an objects and obstacles detection and tracking neural network (OODT NN) bounding boxes from a visible band (VIS) sensor and a thermal infrared (TIR) sensor, according to some embodiments of the invention.

Reference is now made to FIG. 12, which is a flowchart of a process 1200 for an objects and obstacles detection and tracking neural network (OODT NN) applied within a region of interest (ROI) of an image frame, according to some embodiments of the invention.

According to some embodiments, a OODT NN 1204 may be applied within a ROI of an input image frame 1202, generating bounding boxes 1206, applying a low confidence threshold 1208, and then applying a Seq-NMS algorithm 1210 that may include stacking of several image frames 1212, optimal path determination and rescoring 1214, applying a high threshold 1216, an NMS operation 1218 and generating updated bounding boxes 1219.

Figure 14:
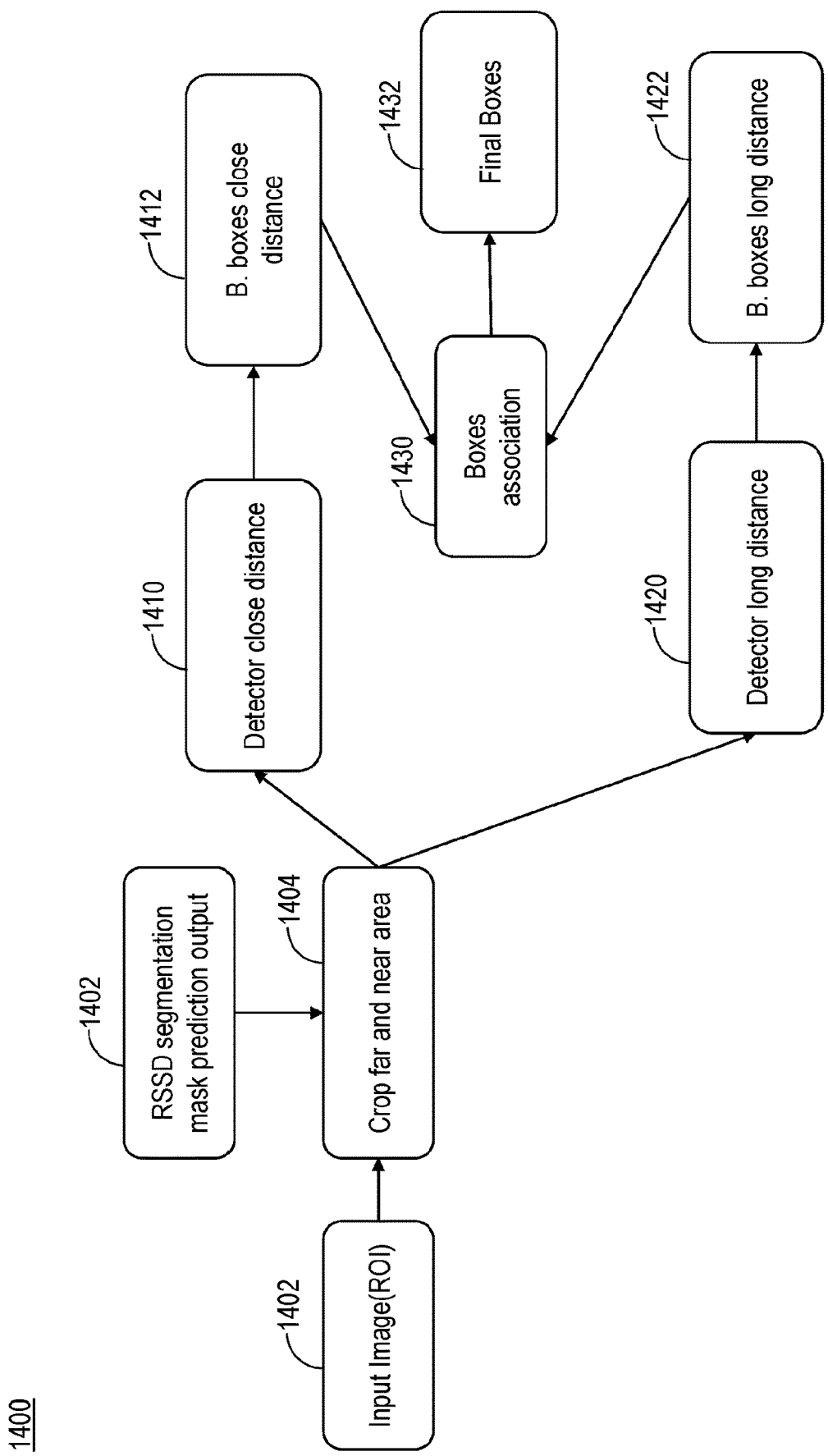
FIG. 14 is a flowchart of a process of an objects and obstacles detection neural network (OODT NN) that includes two region of interest (ROI) instances, a first for a short-range detection and a second for a long-range detection, according to some embodiments of the invention.

Reference is now made to FIG. 14, which is a flowchart of a process 1400 of an objects and obstacles detection neural network (OODT NN) that includes two region of interest (ROI) instances, a first for a short range detection (1402, 1404, 1410, 1412, 1430, 1432) and a second for a long range detection (1402, 1404, 1420, 1422, 1430, 1432), according to some embodiments of the invention.

According to some embodiments, TIR boxes 1302 may be projected 1303 onto VIS image frame (e.g., image frame from the VIS sensor) coordinates, an IOU computation 1304 may be applied on VIS boxes 1301 and TIR boxes projected 1303 on VIS image frame coordinates, and an Hungarian algorithm 1305 may be then applied onto IOU computation 1304. In some embodiments, matched boxes 1310 may be designated 1312 as combined. In some embodiments, unmatched boxes 1320 may be designated 1322 as VIS only or TIR only.

According to some embodiments, unified bounding boxes 1312 may be checked via IOU with existing object tracks 1320, a Hungarian algorithm 1322 and matching the new detection to previous tracks may be then applied. In some embodiments, the result may be a matched track 1324. In some embodiments, the result may be an unmatched 1330 track with prediction 1332. In some embodiments, the result may be an unmatched 1340 track with or a new track 1342.

Reference is now made to FIG. 14, which is a flowchart of a process 1400 of an objects and obstacles detection neural network (OODT NN) that includes two region of interest (ROI) instances, a first for a short range detection and a second for a long range detection, according to some embodiments of the invention.

According to some embodiments, an OODT NN may include two region of interest (ROI) instances (e.g., as described with respect to illustration 1120 in FIG. 11), a first for a short-range detection and a second for long range detection with an overlap between them. The short-range ROI may be typically of larger dimensions as it is typically decimated by the OODT NN prior to inferencing, and due to the short-range objects are typically of large dimensions such that after decimation they are still detectable. The long-range ROI is of smaller dimensions such that it is not decimated at the OODT NN entrance, such that small objects at extended ranges remain detectable.

Figure 15:
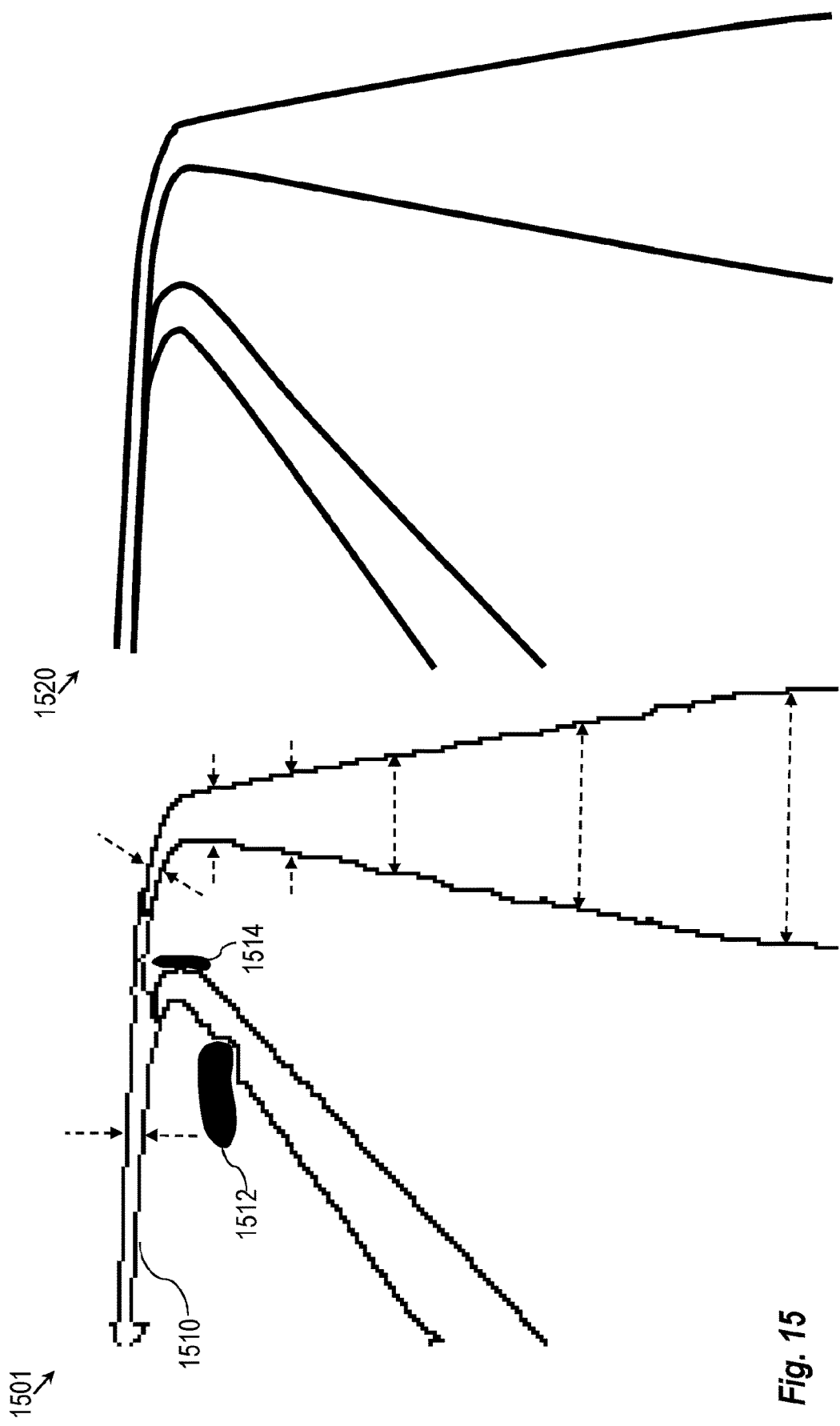
FIG. 15 shows an example of an output of a rails and switches states detection neural network (RSSD NN), according to some embodiments of the invention.

Reference is now made to FIG. 15, which shows an example of an output of a rails and switches states detection neural network (RSSD NN), according to some embodiments of the invention.

Illustration 1501 shows rails delineations 1510 when being partially obstructed by two objects, e.g., a detected vehicle unit 1512 and a detected standing human 1514. It is notable how rail delineations 1510 become slightly distorted, thereby deviating from expected continuity criteria as can be expected from image framed rail projections.

Illustration 1520 shows an interpolated version of the detected rails, for example using splines or other geometrical fitting approaches. When overlaying the actual rail delineations and the smoothed (interpolated) versions as shown in illustration 1530 (FIG. 15 (cont. 1)), various error (or distance) functions may be computed for automated detection of such rail anomalies. This may be used for improved detection of object near or on the rails and may also be used for determining rail malfunctions and rail failures, for example in preventive maintenance applications.

Figure 16A:
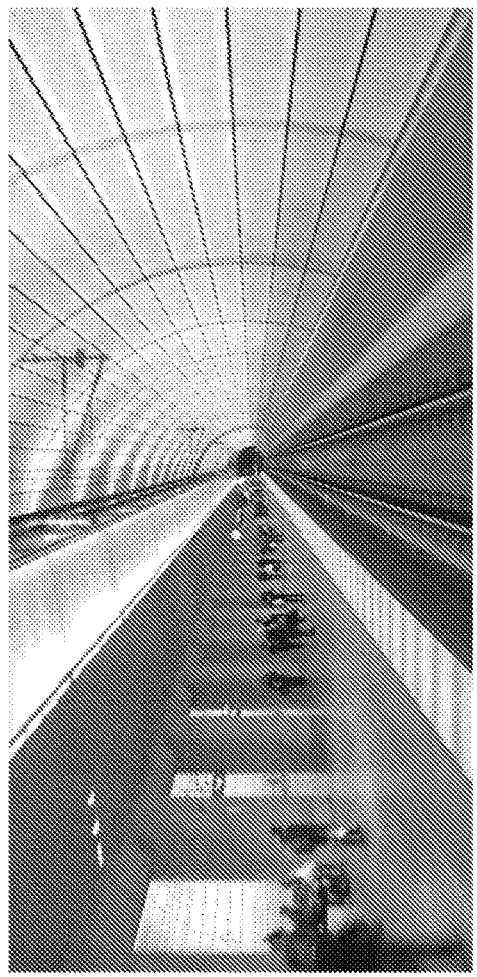
FIGS. 16A and 16B shows a typical station scenario and a corresponding rails and obstacles detection solution, respectively, according to some embodiments of the invention.
Figure 16A:
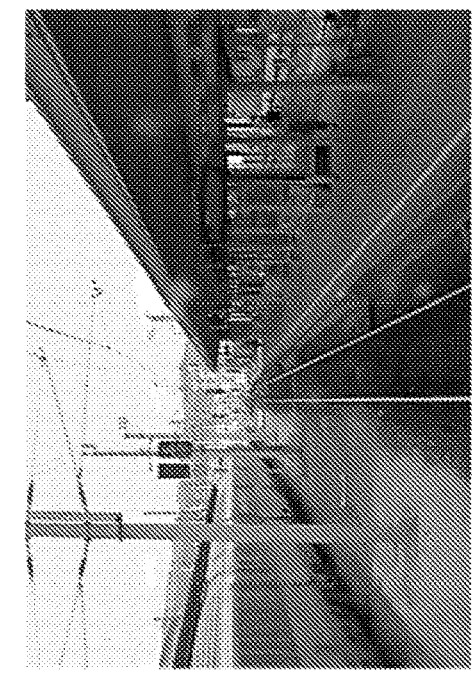
Figure 16A:
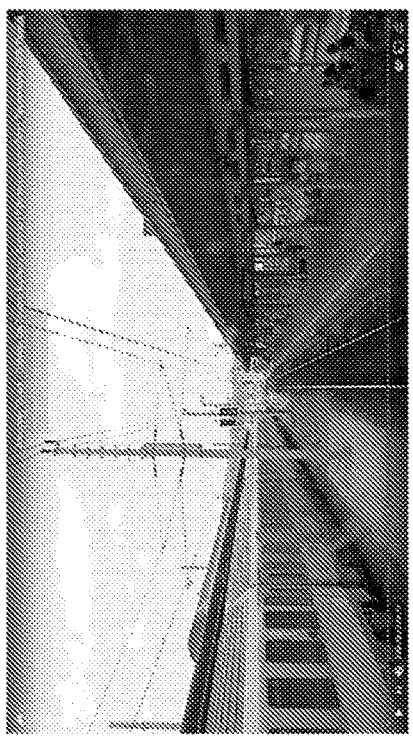
Figure 16A:
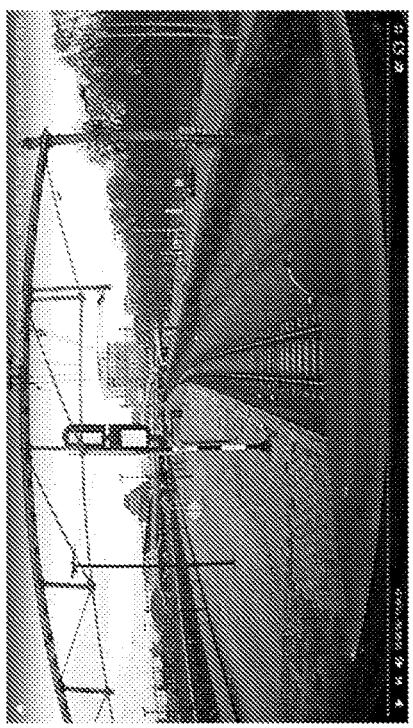
Figure 16B:
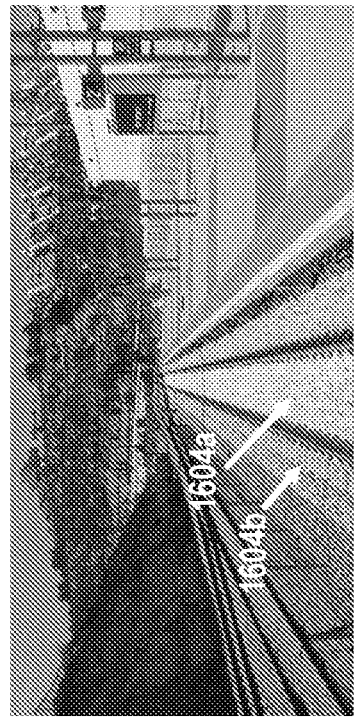
Figure 16B:
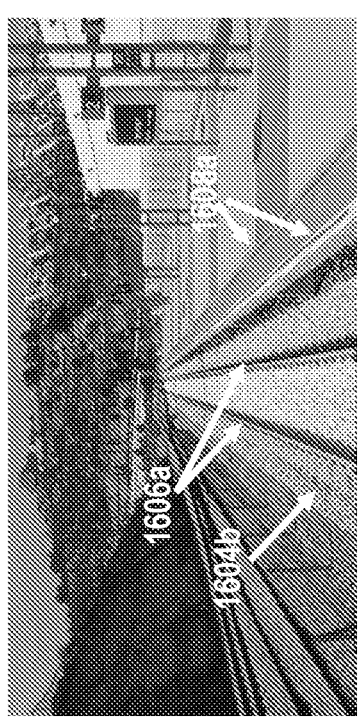
Figure 16B:
Figure 16B:
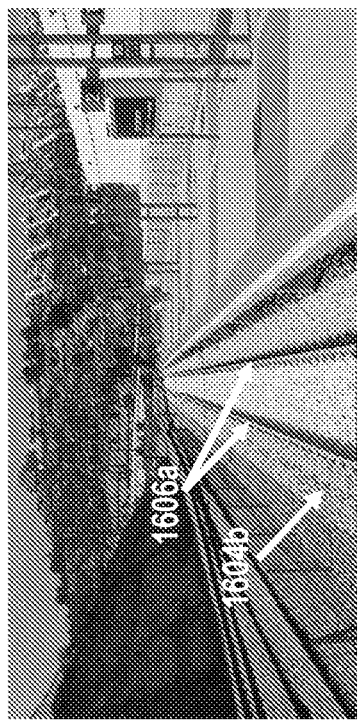

Reference is now made to FIGS. 16A and 16B, which shows a typical station scenario 1600a and a corresponding rails and obstacles detection solution, respectively, according to some embodiments of the invention.

Specific railway safety considerations may relate to trains in a vicinity of stations, wherein commuters are located along a station platform awaiting an arrival of a train. Station platforms are typically delineated with painted (or bump-textured for the blind) lines designating edge of platform and safety zones which are not to be crossed. In crowded station situations, persons may be pushed onto the edge and within the danger zone, and an incoming train may preferably detect such situations and provide respective rapid alarms, e.g., rapid audio horn activation, flashing lights, transmitting a burst or other voice alarm signal to the station speaker system etc. Typical station scenarios are shown in FIG. 16A. In addressing the above safety requirement, some embodiments of the rails and obstacles detection solution (RODS) may follow the following logic as shown in FIG. 16B.

First, RODS function may receive an image frame of railway scene (e.g., as shown in illustration 1602), detect a rail segmentation prediction mask 1604a and a safety zone area 1604b (e.g., as shown in illustration 1604) and extract the actual rails 1606a (e.g., as shown in illustration 1606) based on rail segmentation prediction mask 1604.

Second, RODS function may detect one or more boundary lines of an end of platform and safety zone 1604b (e.g., lines 1608a in illustration 1608). The detection of lines 1608a may be facilitated by the pre-determined safety zone 1604b to which lines 1608a are parallel. Additional pre-knowledge on the height variations of the platform compared to ground level may also be used in estimating the line locations, even when they are not visible to the camera for various reasons (e.g. illumination, obstruction by humans and crowded conditions etc.). For example, RODS's on board sensors such as GPS and access to GIS data regarding railway station locations, may provide the RODS with information regarding where and when to apply such platform safety lines.

Figure 17:
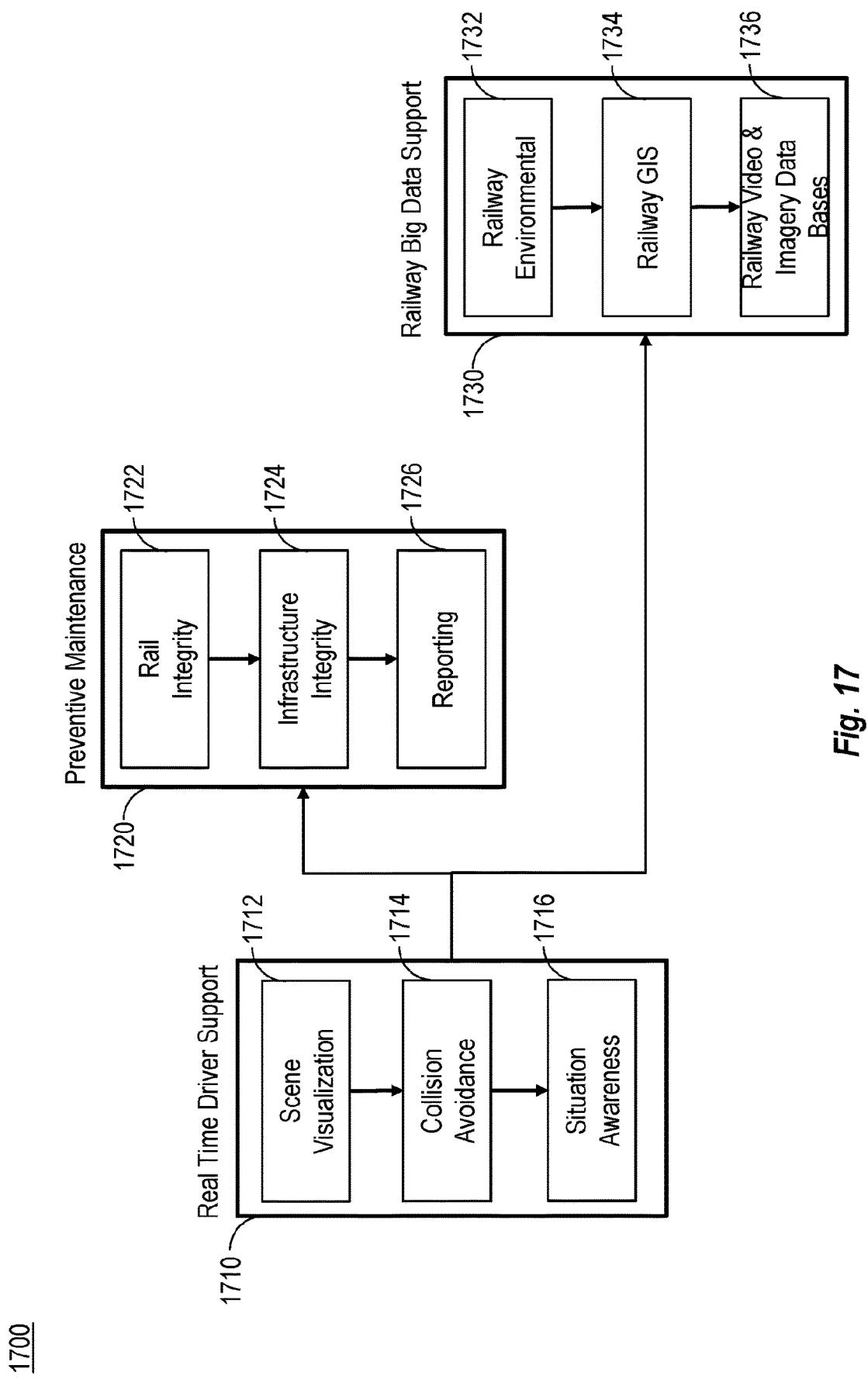
FIG. 17 is a schematic block diagram of a system for driver support, preventing maintenance and big data support, according to some embodiments of the invention.

Reference is now made to FIG. 17, which is a schematic block diagram of a system 1700 for driver support, preventing maintenance and big data support, according to some embodiments of the invention.

According to some embodiments, system17 may include a driver support functionality 1710, preventing maintenance functionality 1720 and a railway big data support functionality 1730.

According to some embodiments, driver support functionality 1710 may include a scene visualization sub-functionality 1712, a collision avoidance sub-functionality 1714 and a situation awareness sub-functionality 1716. Driver support functionality 1710 may be mounted on a train and may be configured to assist in real time (or substantially in real time) a driver to operate the train.

Scene visualization sub-functionality 1712 may be configured to provide a railway scene visualization to the driver and/or to a remote third-party (e.g., supervisor, control room, etc.) in day and night, under all weather and extreme environmental conditions. Scene visualization sub-functionality 1712 may, for example, include one or more imaging sensor(s) (e.g., such as imaging sensor(s) 110 described above with respect to FIG. 1A and imaging sensor(s) 202 described above with respect to FIG. 2).

Collision avoidance sub-functionality 1714 may combine RSSD module (e.g., RSSD module 120 described above with respect to FIG. 1A or RSSD module 210 described above with respect to FIG. 2) and OODT module (e.g., OODT module 130 described above with respect to FIG. 1A or OODT module 212 described above with respect to FIG. 2). Collision avoidance sub-functionality 1714 may be configured to detect a path along which the train travels or to travel and/or to detect and classify objects and obstacles along and in the vicinity of the detected path. The detected objects may be stationary objects that may be located between rails, on the rails and in the vicinity of rails. The detected objects may be moving objects having paths that may result in impending collisions with the moving train. Collision avoidance sub-functionality 1714 may also be in communication with a LOS functionality and GIS functionality that support scene understanding such as LOS obstructions and end of railway occurrences.

Situation awareness sub-functionality 1716 may be similar to control and awareness module 228 described above with respect to FIG. 2. Situation awareness sub-functionality 1716 may be configured to provide decision support, alert management and BIT support, such that real time driver support functionality 1710 is continually capable to monitor operational situations based on the railway scene image framed by imaging sensor(s) and additional information such as signaling, signs etc.

According to some embodiments, preventive maintenance functionality 1720 may include a rail integrity sub-functionality 1722, infrastructure integrity sub-functionality 1724 and reporting sub-functionality 1726. Preventive maintenance functionality 1720 may be an offline functionality and/or may be located external to the train.

Rail integrity sub-functionality 1722 may be configured to provide highly accurate rail integrity and rail infrastructure analysis from low speed to high speed moving train.

Infrastructure integrity sub-functionality 1724 may be configured to provide an analysis of electrical infrastructure such as catenary cable integrity and other rail-related electrical functions such as switch heaters, electrical signaling etc.

Reporting sub-functionality 1726 may be configured to perform fault analysis and prioritization.

According to some embodiments, railway big data support functionality 1730 may include a railway environmental sub-functionality 1732, a railway geographical information system (GIS) 1734 and a railway video and image frame databases 1736. Railway big data support functionality 1730 may be an offline functionality and/or may be located external to the train.

Railway environmental sub-functionality 1732 may be configured to provide an impact on overall rail performance (e.g., punctuality), due to, for example, visibility issues that may require drivers to slow down in specific situations. Compiling the statistics of environmental effects and visibility can assist rail operators in better planning their routes and predicting performance and timelines.

Railway geographical information system (GIS) and interactive update sub-functionality 1734 may be configured to provide an important information pertaining to LOS analysis, for example, due to visual obstructions due to overhead bridges, tunnels, electricity poles, vegetation and tree lines, etc.

Railway video and image frame databases 1736 may depict broad range of scenarios along entire railway tracks. Such video may also be used for training systems, as well as rail operator performance analysis and fault analysis of drivers, for example visually based analysis of driver performance as a function of scenario complexity.

According to various embodiments, the disclosed systems and methods may be utilized in different railway related applications.

In one example, the disclosed systems and methods may be utilized in train-mounted forward looking electro-optical sensing and vision systems for driver-operated applications. In this example, the train may be a tram, urban train, high speed train, freight train etc., and the implementation of the disclosed systems and methods may be based on the following principles: (a) continuous day/night forward looking imaging and vision processing utilizing various imagers such as TIR and VIS imaging sensors, and split screen user displays; and (b) reduced driver workload utilizing automated video/vision processing for object and obstacle detection, tracking and classification, based on some embodiments of the present invention.

In another example, the disclosed systems and methods may be utilized in train-mounted forward looking electro-optical sensing and vision systems for autonomous train applications. In this example, the train may be a tram, urban train, high speed train, freight train etc., and implementations of the disclosed systems and methods may be based on the following principles: (a) continuous day/night forward looking imaging and vision processing utilizing various imagers such as TIR and VIS imaging sensors; and (b) interfaces to train breaking systems, tight communication links with control rooms, utilizing automated video/vision processing for object and obstacle detection, tracking and classification, based on some embodiments of the present invention.

In another example, the disclosed systems and methods may be utilized in wayside electro-optical sensing and vision systems for rail crossing, railway switches, rail station and rail obstruction applications. In this example, the implementations of the disclosed systems and methods may be based on the following principles: (a) continuous day/night stationary imaging and vision processing utilizing various imagers such as TIR and VIS imaging sensors or any other sensors (i.e. LADAR, radar based etc.); and (b) interfaces to communication links to trains and control rooms, utilizing automated video/vision processing for object and obstacle detection, tracking and classification, based on some embodiments of the present invention.

In another example, the disclosed systems and methods may be utilized in train-mounted, upward/downward/forward looking electro-optical sensing and vision systems for rail infrastructure preventive maintenance applications. In this example, the train may be a tram, urban train, high speed train, freight train etc., and implementations of the disclosed systems and methods may be based on the following principles: (a) continuous day/night forward looking imaging and vision processing utilizing various imagers such as TIR and VIS imaging sensors; and (b) improved preventive maintenance utilizing automated video/vision processing for object and obstacle detection, tracking and classification, based some embodiments of the present invention regarding tracks, catenary, electrical equipment etc.

In another example, the disclosed systems and methods may be utilized in train-mounted, electro-optical sensing and vision systems for rail emergency (e.g., "black box") applications. In this example, the train may be a tram, urban train, high speed train, freight train etc., and implementations of the disclosed systems and methods may be based on the following principles: (a) continuous day/night forward looking imaging and vision processing utilizing various imagers such as TIR and VIS sensors; (b) improved recording and alarm provisions including accident, collision, derailment and damage assessment utilizing object and obstacle detection, tracking and classification, based on some embodiments of the present invention; and (c) the smart storage used selectively for logging true alarms and false alarms and upload them according to train position and discard it when not relevant through a FIFO mechanism.

Aspects of the present invention are described above with reference to flowchart illustrations and/or portion diagrams of methods, apparatus (systems) and computer program products according to embodiments of the invention. It will be understood that each portion of the flowchart illustrations and/or portion diagrams, and combinations of portions in the flowchart illustrations and/or portion diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or portion diagram or portions thereof.

These computer program instructions can also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or portion diagram portion or portions thereof. The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or portion diagram portion or portions thereof.

The aforementioned flowchart and diagrams illustrate the architecture, functionality, and operation of possible implementations of systems, methods and computer program products according to various embodiments of the present invention. In this regard, each portion in the flowchart or portion diagrams can represent a module, segment, or portion of code, which includes one or more executable instructions for implementing the specified logical function(s). It should also be noted that, in some alternative implementations, the functions noted in the portion can occur out of the order noted in the figures. For example, two portions shown in succession can, in fact, be executed substantially concurrently, or the portions can sometimes be executed in the reverse order, depending upon the functionality involved. It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

In the above description, an embodiment is an example or implementation of the invention. The various appearances of "one embodiment", "an embodiment", "certain embodiments" or "some embodiments" do not necessarily all refer to the same embodiments. Although various features of the invention can be described in the context of a single embodiment, the features can also be provided separately or in any suitable combination. Conversely, although the invention can be described herein in the context of separate embodiments for clarity, the invention can also be implemented in a single embodiment. Certain embodiments of the invention can include features from different embodiments disclosed above, and certain embodiments can incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A method of rails and obstacles detection, the method comprising:
   receiving a plurality of image frames from at least one imaging sensor installed on a locomotive of a train, wherein the at least one imaging sensor facing a direction of travel of the train;
   determining, for each image frame of a subset of the plurality of image frames, an input data structure comprising the respective image frame and a history element, wherein the history element comprises a segmentation mask prediction determined for an image frame preceding to the respective image frame; and
   determining, based on the input data structure of each of the image frames of the subset and using a rails and switches states detection neural network (RSSD NN), a segmentation mask prediction of the respective image frame, wherein the segmentation mask prediction comprises at least a current railway path along which the train travels.

2. The method of claim 1, wherein the segmentation mask prediction further comprises at least one turnout along the current railway path representing a state of corresponding at least one switch along the current railway path.

3. The method of claim 1, further comprising training the RSSD NN prior to inferring thereof, the training is based on a training subset of training image frames and comprises a predetermined number of training cycles, wherein each of the training cycles comprises:
   determining, for each training image frame of the training subset, a training input data structure comprising the respective training image frame and a training history element, wherein the training history element comprises a training segmentation mask prediction determined for a training image frame preceding to the respective training image frame;

determining, based on the training input data structure of each of the training image frames of the training subset and using the RSSD NN, a training segmentation mask prediction of the respective training image frame;

comparing the training segmentation mask prediction determined for each of the training image frames of the training subset with at least one predetermined annotated mask of the training image frame; and updating the training segmentation mask prediction determined for each of the training image frame of the training subset based on the comparison thereof.

4. The method of claim 3, further comprising augmenting the training segmentation mask prediction determined during at least one training cycle of the predetermined number of cycles, wherein augmenting of the training segmentation mask prediction comprises at least one of:

zeroing the entire training segmentation mask prediction;

zeroing a predetermined portion of the training segmentation mask prediction; and replacing the predetermined portion of the training segmentation mask prediction with a specified label that retains a shape and location of a current railway path and ignores a distinction between the current railway path and at least one turnout along the current railway path.

5. The method of claim 1, further comprising determining, in at least one image frame of the subset, based on the segmentation mask prediction determined for the respective frame and using an objects and obstacles detection and tracking neural network (OODT NN), at least one object/obstacle on or in vicinity of the current railway path.

6. A system for rails and obstacles detection, the system comprising:

at least one imaging sensor installed one a locomotive of a train to face a direction of travel of the train, to obtain a plurality of image frames;

a rails and switches states detection (RSSD) module comprising a RSSD neural network (RSSD NN), the RSSD module is configured to:

determine, for each image frame of a subset of the plurality of image frames, an input data structure comprising the respective image frame and a history element, wherein the history element comprises a segmentation mask prediction determined for an image frame preceding to the respective image frame; and determine, based on the input data structure of each of the image frames of the subset and using the RSSD NN, a segmentation mask prediction of the respective image frame, wherein the segmentation mask prediction comprises at least a current railway path along which the train travels.

7. The system of claim 6, wherein the segmentation mask prediction further comprises at least one turnout along the current railway path representing a state of corresponding at least one switch along the current railway path.

8. The system of claim 6, further comprising an objects and obstacles detection and tracking (OODT) module comprising an OODT neural network (OODT NN), wherein the OODT module is configured to determine, in at least one image frame of the subset, based on the segmentation mask prediction determined for the respective frame and using the OODT NN, at least one object/obstacle on or in vicinity of the current railway path.

9. The system of claim 6, wherein the at least one sensor is at least one of: a visual band imaging sensor and a thermal infrared sensor.

10. The system of claim 6, wherein the at least one sensor is at least one of: a narrow field-of-view imaging sensor and a wide field-of-view imaging sensor.

* * * * *